United States Patent [19]
Scott

[11] Patent Number: 6,078,805
[45] Date of Patent: *Jun. 20, 2000

[54] SYSTEM AND METHOD FOR CELLULAR RESELLER CONTROL OF OUTBOUND CALLS FROM A MOBILE STATION

[75] Inventor: Charles Ronald Scott, Allen, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/778,730

[22] Filed: Dec. 31, 1996

[51] Int. Cl.⁷ .................................................. H04Q 7/00
[52] U.S. Cl. .......................................... 455/406; 455/408
[58] Field of Search .................................. 455/422, 426, 455/552, 553, 461, 465, 445, 405, 406, 408, 410, 411, 414, 565; 379/207, 114, 133, 199, 200

[56] References Cited

U.S. PATENT DOCUMENTS

| | | | |
|---|---|---|---|
| 4,769,834 | 9/1988 | Billinger et al. | 379/207 |
| 5,068,889 | 11/1991 | Yamashita | 455/411 |
| 5,216,703 | 6/1993 | Roy | 379/355 |
| 5,353,331 | 10/1994 | Emery et al. | 455/445 |
| 5,353,335 | 10/1994 | D'Urso et al. | 379/67 |
| 5,463,674 | 10/1995 | Gillig et al. | 455/552 |
| 5,465,293 | 11/1995 | Chiller et al. | 379/207 |
| 5,473,671 | 12/1995 | Partridge et al. | 455/445 |
| 5,500,379 | 3/1996 | Chiu et al. | 455/410 |
| 5,550,912 | 8/1996 | Akinpelu et al. | 379/207 |
| 5,570,416 | 10/1996 | Kroll | 379/114 |
| 5,577,100 | 11/1996 | McGregor et al. | 455/406 |
| 5,579,379 | 11/1996 | D'Amico et al. | 379/114 |
| 5,592,535 | 1/1997 | Klotz | 455/406 |
| 5,592,539 | 1/1997 | Amarant et al. | 379/114 |
| 5,659,598 | 8/1997 | Byrne et al. | 455/426 |
| 5,673,308 | 9/1997 | Akhavan | 455/426 |
| 5,680,446 | 10/1997 | Fleischer, III et al. | 379/114 |
| 5,722,067 | 2/1998 | Fougnies et al. | 455/406 |

*Primary Examiner*—Reinhard J. Eisenzopf
*Assistant Examiner*—Marsha D. Banks-Harold

[57] ABSTRACT

A system and method for making a call from a dual mode mobile station functioning in either a PCS (personal communication service) mode or a cellular mode permits PCS communications if the station receives a beacon of a sufficient strength in a PCS frequency band, and alternatively permits cellular communications if the station does not receive a beacon of a sufficient strength in the PCS frequency band. In order for the dual mode station to perform in both a cellular mode and a PCS mode, a single service provider (reseller) will attempt to provide both types of services. The reseller must ensure that a call can be properly billed to a mobile station user for both a call received at the dual mode mobile station and a call transmitted from the dual mode mobile station. Accordingly, methods and systems are provided for controlling cellular service access to and from the mobile station. For an inbound call to the station, the originating caller is provided an access number that accesses an IN platform, which communicates with the station to authenticate the call, bills the call, and routes the call. For an outbound call from the station, the mobile station transmits an access number, the user-dialed number, and identification information for the station to an IN platform, which handles call billing and routing.

10 Claims, 20 Drawing Sheets

SYSTEM AND METHOD FOR CELLULAR RESELLER CONTROL OF OUTBOUND CALLS FROM A MOBILE STATION

CROSS-REFERENCE TO OTHER APPLICATIONS

The following applications of common assignee contain some common disclosure:

U.S. patent application entitled "System and Method for a Wireless Network of Unlicensed Personal Communications Service Areas With Local Switch Interfaces and Enhanced Customer Features," filed Dec. 31, 1996, Attorney Docket No. RIC-96-024 (1575.1680000).

U.S. patent application entitled "System and Method for Cellular Reseller Control of Inbound Calls To a Mobile Station," filed Dec. 31, 1996, Attorney Docket No. RIC-96-062 (1575.1880000).

BACKGROUND OF THE INVENTION

1. Field of the Invention

The following invention relates generally to a network of mobile stations, and more particularly to a network of dual mode mobile stations functioning in an unlicensed personal communications service band or in a cellular frequency band with specialized access to telecommunications network elements in either of these frequency bands.

2. Related Art

Independent owners of roadside plazas currently provide a debit card service to users, such as truckers. Debit account subscribers are debit card holders that buy and use prepaid cards to make calls. The debit cards are used to pay for telephone calls made at pay phones located at roadside plazas.

The subscribers call a toll free phone number associated with a centralized debit platform that handles the debit card billing. The debit platform, telephone call switching and pay phone managed by a service provider. The debit platform takes an accounting of the prepaid debit card amount consumed by the subscriber and debits the account.

The debit platform provides the subscriber with periodic audible messages (such as tones, recorded or live voice messages, or the like) alerting the subscriber of the remaining calling time or units remaining on the debit card. The phone service provider then bills the cost of the prepaid card calls to the roadside plaza owner/operator who sold the cards to the subscribers.

The problem with the use of prepaid debit cards is that there are a limited number of telephones available for calling card use at any given plaza. This limits the amount of revenue that can be generated by the plaza owners/operators. It also forces subscribers to wait to make calls until a telephone is available. In the trucking industry, truckers frequently must wait for specific instructions concerning pick-ups and deliveries. For example, a trucker may wait for a load to transport in the direction of home after delivering a load, rather than returning home with an empty rig. The waiting period can last for days, causing the trucker to simply wait at the plaza and periodically call a dispatcher or supervisor for updated instructions, since there is no way to receive immediate communications.

Of course the truckers or trucking companies can invest in cellular telephones for the truckers to use. However, since both outgoing and incoming cellular calls are charged at a high rate on a per-minute basis, in addition to having high registration fees, this solution is cost prohibitive. What is required is a system to permit truckers to freely roam from plaza to plaza and within the plazas, while maintaining communications in an efficient and economical manner.

SUMMARY OF THE INVENTION

The present invention is directed to a system and method for providing customers the ability to communicate in either a cellular frequency mode or in a personal communications service (PCS) mode. The invention is described with respect to an unlicensed PCS (UPCS) frequency mode, but is capable of functioning in a PCS mode of any frequency range.

Specifically, the customer is provided a dual mode mobile station capable of functioning in a PCS mode (i.e., when the mobile station receives a PCS beacon of sufficient strength indicating that the mobile station is in a PCS area) or in a cellular mode.

Cellular communications, a well known technology, typically operate within the 800–900 megahertz (MHz) range. Cities or counties are divided into large "cells," each cell being equipped with a high-powered radio transmitter/receiver. The cells form a honeycomb pattern over the terrain. Through control of transmission power, radio frequencies assigned to each cell can be limited to the boundaries of a particular cell.

PCS is a lower-powered, higher-frequency technology than that of cellular technology. Specifically, UPCS (unlicensed PCS) operates between 1910 and 1930 MHz, versus the 800–900 MHz range for typical cellular networks. A UPCS area is determined by cell borders wherein a mobile station may transmit and receive communications from a UPCS base station. In the instant invention, a telecommunications service provider, commonly referred to as a carrier (e.g., MCI Telecommunications Corporation) uses its facilities to route a call between the UPCS areas. It should be noted that the instant invention can perform in any PCS mode, and does not necessarily have to function in a UPCS mode.

A first embodiment of the present invention is directed to a system and method for providing communications to a plurality of dual mode mobile stations (e.g., mobile handsets) functioning in either a PCS (personal communication service) mode or in a cellular mode. If the station receives a PCS frequency band beacon of a predetermined strength, then communications is provided to a station in the PCS mode. On the other hand, if the station does not receive a PCS frequency band beacon of the predetermined strength, then communication is provided to a station in the cellular mode.

The station is authenticated and registered when the station functions in the PCS mode. This includes transmitting a unique identification code for the station to an authentication and registration center. The authentication and registration center searches a database for the unique identification code, and if the code is found therein, then the authentication and registration center stores the PCS area wherein the station is located.

Transmission of an outbound call from the station (functioning in the PCS mode) includes using an advanced intelligent network to determine how to route the call and routing the call from the station as determined by the advanced intelligent network. The unique identification code and a dialed number are transmitted to a mobility switch. The unique identification code, the dialed number, and site information (indicating the PCS area wherein the station is located) are transmitted from the mobility switch to the advanced intelligent network. The advanced intelligent network then determines how to route the call based upon whether the call is a private dialing plan call (to be billed in arrears to a private dialing plan customer) or a debit call (to be billed to a user of the station in advance of the call). Specifically, the advanced intelligent network uses the unique identification code for the station to index a table (associated with the station) within the advanced intelligent network, and searches for the dialed number in the table to determine whether the call is a private dialing plan call, a debit call, or a restricted call.

If it is determined that the outbound call is a private dialing plan call, then a network switching facility is designated for handling of the private dialing plan call. The unique identification code for the station, the dialed number, and the site information are transmitted to the designated network switching facility from the mobility switch. The dialed number is translated to a public switched telephone network (PSTN) number using a translation and routing table. The call is routed to a destination caller. (Call completion is permitted using the PSTN number.) Finally, the call is billed to the private dialing plan customer in arrears.

If it is determined that the outbound call is a debit call, then the call is rated to determine a minimal amount of funds required to place the call. It is determined whether there are sufficient funds registered to the station to complete the call for a predetermined period of time. If it is determined that there are insufficient funds registered to the station (to complete the call for the predetermined period of time), then the station user is permitted to purchase call credits. The call credits can be consumed during this call or during a subsequent outbound or inbound call. If there are sufficient funds registered to the station to complete the call (including via recently purchased call credits), a network switching facility is designated for handling of the call. The unique identification code for the station, the dialed number, and the site information are transmitted to the designated network switching facility from the mobility switch. Finally, the call is routed to a destination caller using the dialed number and completion of the call is permitted.

Transmission of an inbound call to the station (functioning in the PCS mode) includes first determining whether the call is a private dialing plan call (to be billed in arrears to a private dialing plan customer) or a debit call (to be billed to the user of the station in advance of the call), by using an advanced intelligent network to determine how to route the call, and by routing the call from the station as determined by the advanced intelligent network.

If it is determined that the inbound call is a private dialing plan call, then the dialed number is translated to a PSTN number using a translation and routing table. A set of routing instructions and the PSTN number are transmitted to a switching facility. The call and the dialed number are then sent to the advanced intelligent network.

If it is determined that the inbound call is a debit call, then a set of routing instructions and the dialed number are transmitted to a switching facility. The call and the dialed number are then sent to the advanced intelligent network.

Next, the advanced intelligent network queries an authentication and registration center for a temporary routing number. Here, the advanced intelligent network submits a request to the authentication and registration center for a location of the handset, and the authentication and registration center receives the temporary routing number from a mobility switch providing connection to the handset. If the station is located during the query, then the call is routed to a network facility switch using the temporary routing number. The network facility switch has a connection to the mobility switch providing connection to the handset. However, if the station is not located during the query, then the call is routed to a cellular services provider to attempt routing of the call in a cellular mode.

If it is has been determined that the inbound call is a private dialing plan call, then routing and completion of the call to the station is always permitted. The call is billed to the private dialing plan customer for the call in arrears.

On the other hand, if the inbound call is a debit call, then the call is rated to determine the minimal amount of funds required to place the call. It is determined whether there are sufficient funds registered to the station to complete the call for a predetermined period of time (associated with the minimal amount of funds required to place the call). As with an outbound call, the user of the station is permitted to purchase call credits if it is determined that there are insufficient funds registered to the station to complete the call (for the predetermined period of time). The call credits are consumed either during the call or during a subsequent outbound or inbound call. If there are sufficient funds registered to the station to complete the call for the predetermined period of time (including via recently purchased call credits), then routing and completion of the call to the station is permitted.

A second embodiment of the present invention is directed to a system and method for controlling an inbound call received by a mobile station functioning in the cellular frequency band. Here, use of a cellular telephone number is purchased from a cellular services provider by a reseller and maintained confidential from a user of the station.

A destination calling number is assigned to the station that is different from the cellular telephone number. The station user is provided access to the destination calling number for an inbound call to the station.

When this destination number is dialed by an originating caller, the destination calling number is transmitted to an IN (intelligent network). The IN platform determines if the destination calling number is valid. If it is determined that the call is a valid call, then authorization and completion of the inbound call is commenced. If the destination calling number is not a valid number, then completion of the call is prevented.

The step of authorizing and completing the call includes using the IN platform to look up the destination calling number to determine whether the call is to a recognized station. Specifically, the IN platform is used to look up the destination calling number to determine whether the call is a private dialing plan call (to be billed in arrears to a private dialing plan customer) or a debit call (to be billed in advance to the user of the station in advance of the call).

Determining whether the call is a private dialing plan call or a debit call can be accomplished as follows. The destination calling number is translated back to the cellular telephone number. The cellular number is transmitted to the cellular services provider. The cellular services provider locates the station using the cellular telephone number. Finally, the call is authorized via communications between the IN platform and the station.

In one embodiment, the step of authorizing the call includes use of a secret code. An answer supervision signal is received from the station and subsequently a secret code is transmitted from the IN platform to the station. The secret code received at the station is authenticated in order to determine whether the secret code is a valid secret code. If it determined that the secret code is not a valid secret code, then completion of the call is prevented. If it is determined that the secret code is a valid secret code, then (1) a new secret code is reset and stored in the IN platform and in the station, (2) the call is completed between the originating caller and the station, and (3) the call is billed to the private dialing plan customer in arrears if the call is a private dialing plan call, or instead is billed to the user of the station in advance if the call is a debit call.

In another embodiment, the step of authorizing the call includes use of a platform identification information. The destination calling number is translated back to the cellular telephone number. The IN platform is used to transmit both a platform identification number (previously provided by the cellular services provider) and the cellular telephone number to the cellular services provider. It is then determined whether the platform identification information matches values stored in a database. If the platform identification information is not found in the database, then call completion is prevented. If the platform identification information is found in the database, then (1) the station using the cellular telephone number is located; (2) the call between the originating caller and the station is completed, and (3) the call is billed to the private dialing plan customer in arrears if the call is a private dialing plan call, or instead is billed to the user of the station in advance if the call is a debit call.

A third embodiment of the present invention is directed to a system and method for controlling an outbound call transmitted from a mobile station in a cellular frequency band. Here, use of a cellular telephone number is purchased from a cellular services provider by a reseller and maintained confidential from a user of the station.

If the station user dials a destination number, then an access number is automatically transmitted to a cellular services facility for accessing an IN platform. Access to the IN platform is obtained for validation of the call. The call is then rated (to determining billing) and completed between the user and a called party.

The access number is first transmitted to a switching facility having access to a carrier capable of transmitting the access number to the IN platform. Second, the access number is transmitted to a switching facility of the carrier, this switching facility transmitting the access number to the IN platform for validation. Third, a signal is transmitted to the station indicating that a valid access number has been received. Finally, a mobile station identification number and the dialed destination number are transmitted to the IN platform.

The step of rating the call and completing the call features (1) transmitting the call from a cellular area wherein the station is located to the IN platform to determine how to bill and route the call, and (2) using the station identification number and the dialed destination number to determine if the call is a private dialing plan call, a debit call, or a restricted call.

In one embodiment, the step of rating the call and completing the call includes billing the call to a private dialing plan customer in arrears if it is determined that the call is a private dialing plan call.

If it has been determined that the outbound call is a debit call, then completion of the call is permitted if it determined that there are sufficient funds registered to the station to complete the call for a predetermined period of time. If it is determined that there are insufficient funds registered to the station to complete the call for the predetermined period of time, then the user of the station is permitted to purchase call credits.

In another embodiment, the step of rating the call and completing the call includes preventing completion of the call if it is determined that the call is a restricted call.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
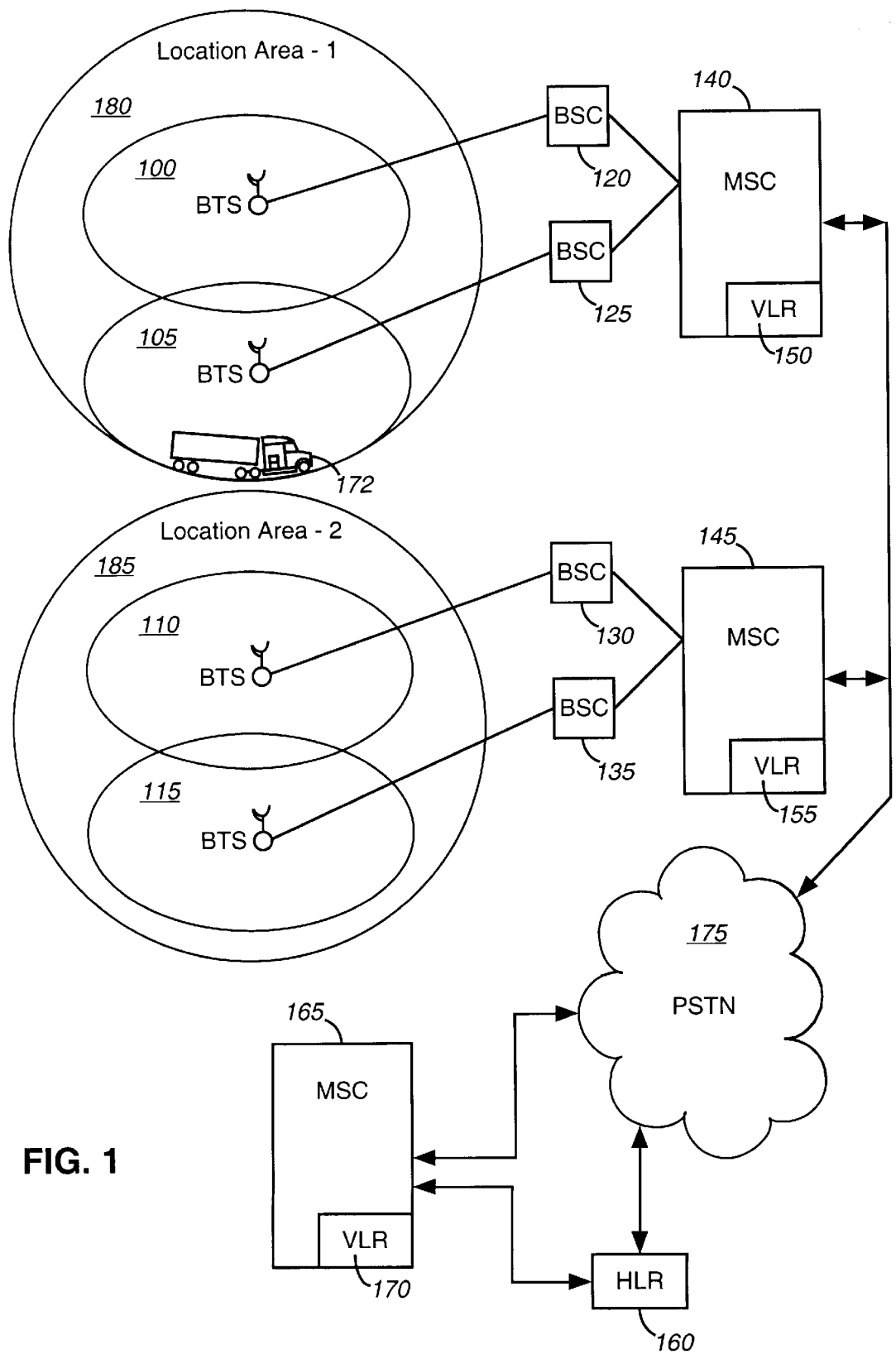
FIG. 1 is an exemplary illustration of a cellular mobile telephone system, in particular a cellular mobile system having a global mobile switching system architecture, according to an embodiment of the present invention.

The present invention is directed to a system and method for implementing a wireless network of dual mode mobile stations capable of functioning in both a cellular mode of communications and an personal communications service (PCS) mode of communications. Although the instant invention is described with respect to an unlicensed PCS (UPCS) mode, the invention is capable of functionioning in a PCS mode of any frequency range.

Specifically, systems and methods are presented for three general embodiments, for each of which specific embodiments are discussed. The three general embodiments for the invention are: (1) a wireless network of UPCS areas with local switch interfaces and enhanced customer features, (2) control by a cellular reseller of inbound calls to a dual mode mobile station, and (3) control by a cellular reseller of outbound calls from a dual mode mobile station.

In the first embodiment, the dual functionality of the dual mode mobile station is discussed with respect to both a cellular and a UPCS mode of communications. Specifically, the dual mode mobile station transmits calls to and receives calls from another caller in a UPCS mode if the dual mode mobile station receives a beacon of sufficient strength and specific identity from a UPCS base station. Otherwise, the dual mode mobile station transmits calls to and receives calls from another caller in a cellular mode of communications. A discussion of customer billing with respect to the UPCS mode of communications is also presented. A call made by a dual mode mobile station user, whether inbound (arriving at the dual mode mobile station) or outbound (placed from the dual mode mobile station) can be debited to the user in advance of the call or can instead be billed to the customer (paying for the network of dual mode mobile stations) in arrears of the call.

In the second embodiment, a specific system and method of reseller control of a dual mode mobile station is presented for an inbound call arriving at a dual mode mobile station. It is likely that for the dual mode mobile station to perform in both a cellular mode and a UPCS mode of communications, a single service provider will purchase use of cellular phone numbers and resell use of these cellular phone numbers to a dual mode mobile station customer. To avoid fraud and protect the reseller's ability to adequately bill the call to the customer, in one embodiment a communication between an originating caller, an IN (intelligent network) platform, and a destination mobile station takes place to authenticate the call. In that communication, a secret code is exchanged between the IN platform and the destination dual mode mobile station. In addition, a new secret code is calculated in both the IN platform and the destination dual mode mobile station for future communications. To effect the same ends, namely to avoid fraud, in another embodiment the cellular services provider itself authenticates the call using an IN platform identification number. The call can be billed as a private dialing plan call to the customer in arrears or as a debit call to the mobile station user in advance, similarly as with respect to the first embodiment.

In the third embodiment, a specific system and method of reseller control of a dual mode mobile station is presented for an outbound call transmitted from the dual mode mobile station. Similarly to the second embodiment, a single service provider will purchase use of cellular phone numbers and resell use of these cellular phone numbers to a dual mode mobile station customer. To avoid fraud and protect the reseller's ability to adequately bill the call to the customer, initially the reseller provides the originating mobile station user a special access number to gain access to the cellular network. A network switch receives the call and routes it to an IN platform, which in turn communicates with the originating dual mode mobile station to authenticate and bill the call. The call can be billed as a private dialing plan call to the customer in arrears or as a debit call to the mobile station user in advance, similarly as with respect to the first embodiment.

I. An Example Environment for the Invention

The instant invention can be described in terms of a straightforward example environment. The example environment is a nationwide communication service used by truckers. Each trucker can receive an inbound call from: (1) an individual recognized as being part of a private communications network provided for the trucker's carrier company, or (2) an individual not associated with a private communications network, i.e., an individual using the public switched telephone network (PSTN). Similarly, each trucker can make an outbound call to: (1) an individual recognized as being part of a private communications network provided for the trucker's carrier company, or (2) an individual not associated with a private communications network. Private communications are billed to the trucker's carrier company in arrears (i.e., billed at the end of the month), whereas personal communications are debited to the trucker's personal account after appropriate authorization before the call is routed.

Although the invention is described in terms of this example environment, description in these terms is provided for convenience only. It is not intended that the invention be limited to the application in this example environment. In fact, after reading the following description, it will become apparent to a person skilled in the relevant art how to implement the invention in alternative environments. For example, the invention can be implemented by the transportation industry (e.g., providing services for commuters), educational institutes (e.g., providing services for students and faculty), or the retail industry (e.g., providing services for shoppers at shopping malls).

II. System and Method for Wireless Network of Unlicensed Personal Communications Service Areas with Local Switch Interfaces and Enhanced Customer Features The instant invention provides each caller in a wireless network with a dual mode mobile station. The dual mode mobile station is capable of operating in both a cellular mode and a UPCS (unlicensed personal communications service) mode of communications. The features of the instant invention with respect to these respective modes of communications are illustrated by the discussion below.

A. Cellular Mode of Communications

The following is a description of the invention with respect to a cellular mode of communications.

Cellular communications, a well known technology, typically operates on the 800–900 megahertz range. Cities or counties are divided into "cells" each cell being equipped with a high-powered radio transmitter/receiver. The cells form a honeycomb pattern over the terrain. Through control of transmission power, radio frequencies assigned to each cell can be limited to the boundaries of a particular cell.

When a dual mode mobile station functioning in a cellular mode moves from one cell to another cell, a central switching office monitors this movement and at the appropriate time, transfers the phone call to the new cell at a different frequency in such a manner that is not noticeable to the caller. Equipment at the central switching office tracks and coordinates all the dual mode mobile stations, in addition to all other cellular handsets, in a service area via the identification number of each mobile station.

This unique identification numbers, generically known as an ESN (electronic security number) and MIN (mobile identification number) are stored onto a memory chip (called a PROM or EPROM) located in each dual mode mobile station, as well as any other station (e.g., handset) functioning in a cellular mode. Each time the telephone is used, the ESN and MIN are transmitted to the central switching office by means of specific signaling protocols during a dialing sequence in a routine that is undetectable to the user.

FIG. 1 is an exemplary illustration of a CMTS (cellular mobile telephone system), in particular a cellular mobile system having a GSM (global mobile switching system) architecture. The GSM architecture described below is used only to demonstrate the instant invention. As easily recognized by those of ordinary skill, the instant invention can function in any cellular mobile system.

The GSM architecture of FIG. 1 comprises BTSs (base transceiver systems) 100, 105, 110 and 115, BSCs (base station controllers) 120, 125, 130 and 135, MSCs (mobile service switching centers) 140, 145, 165, VLRs (visitor location registers) 150, 155, 170, HLR (home location register) 160, location area_1 180, and location area_2 185, and PSTN (public switched telephone network) 175.

Each BTS-BSC pair comprises a base station subsystem (BSS). For example, BTS 100 and BSC 120 comprise a single BSS, BTS 105 and BSC 125 comprise a single BSS, etc. Each cell (schematically shown as an oval area serviced by a single BTS) is controlled by one or more BTSs 100, 105, 110 and 115 which are under the management of one or more BSCs 120, 125, 130 and 135. BSCs 120, 125, 130 and 135 are connected to MSCs 140, 145, respectively. Specifically, BSCs 120 and 125 are connected to MSC 140, while BSCs 130, 135 are connected to MSC 145. Each MSC 140, 145 and 165 is a central switching center that provides services and coordination between a dual mode mobile station (functioning in the cellular mode) user and the PSTN 175 and between any two or more dual mode mobile station users. Hence, MSCs 140, 145, and 165, for example, provide an interconnection point between the cellular system and a PSTN.

The cellular services provider for each cellular handset, including each dual mode mobile station, stores registration, validation, access capabilities, and supplementary services and features information for the handset in a single associated HLR 160. HLR 160 is a database that is accessed by the cellular service provider facilities. The dual mode mobile station for trucker 172 has associated HLR 160, connected to the dual mode mobile station home MSC 165. The information stored in HLR 160 comprises dynamic data that will allow an incoming call to be routed immediately to the called mobile station.

VLRs 150, 155, and 170 are local databases connected to MSCs 140, 145, and 165, respectively. Each VLR 150, 155, and 170 contains registration information for a dual mode mobile station visiting in a particular area. In other words, each VLR 150, 155, and 170 stores the information relating to a mobile subscriber in a given coverage area, allowing a connected MSC 140, 145, or 165 to set up incoming and outgoing calls.

Each dual mode mobile station performs the function of location updating. As shown in FIG. 1, each cell is serviced by one BTS 100, 105, 110, and 115. Specifically, BTSs 100, 105 are located in location area_1 180, whereas BTSs 110, 115 are located in location area_2 185.

Each location area, e.g., location area_1 180 or location area_2 185, is divided into one or more cells, schematically shown as oval-shaped regions within these location areas. Each VLR 150, 155 and 170 serves one or more location areas. As shown in FIG. 1, VLR 150 serves location area_1 180, while VLR 155 serves location area_2 185.

VLR functionality is performed as follows. The VLR for a particular location area ignores dual mode mobile stations which are not switched on. Each dual mode mobile station stores a location area identity code identifying the location area wherein the mobile station was last located. Whenever a dual mode mobile station is switched on, the dual mode mobile station retrieves a stored location area identity code and compares that code with an identity code being broadcast within the particular cell wherein the dual mode mobile station is currently located. If the identity codes match, then the VLR has already been updated correctly and the dual mode mobile station need not take further action.

However, if there is no match between the location area identity code stored in the dual mode mobile station and the identity code being broadcast in the cell wherein the dual mode mobile station is located, then the dual mode mobile station must identify itself by transmitting its subscriber identity (e.g., ESN and MIN) to an appropriate BTS (i.e., the BTS servicing the cell wherein the dual mode mobile station is located), which is forwarded to the BSC serving the BTS, and passed on to the associated VLR. For example, suppose trucker 172 switches on his dual mode mobile station while located in the cell serviced by BTS 105 of location area_1 180. BTS 105 transmits the trucker's dual mode mobile station identification information from BTS 105 to BSC 125, which correspondingly transmits the dual mode mobile station information to VLR 150. VLR 150 will receive the dual mode mobile station identification information and assign a temporary identification information to the trucker's dual mode mobile station. VLR 150 receives information relating to the trucker's previous location area (i.e., the location area wherein the trucker's dual mode mobile station was last turned on) and the location area wherein the dual mode mobile station is presently located, namely location area_1 180.

In addition, each time a dual mode mobile station is moved into a new location, the corresponding VLR for the new location area is informed of this status change. Suppose trucker 172 travels from location area_1 180 to location area_2 185, as shown in FIG. 1. Here, the dual mode mobile station is carried into a new location area, namely location area_2 185, which is serviced by a different VLR, namely VLR 155.

Accordingly, HLR 160, the VLR wherein the dual mode mobile station is currently located, namely VLR 155, and the VLR of the location area wherein the dual mode mobile station was previously located, namely VLR 150, must all be updated and informed of the trucker's new status. Specifically, the "old" VLR 150 erases the data relating to the dual mode mobile station for trucker 172, the "new" VLR 155 records relevant parameters needed to process calls for the dual mode mobile station for trucker 172, and HLR 160 records the information that the dual mode mobile station is now in an area serviced by VLR 155.

The dynamics of a call outbound from one dual mode mobile station and inbound to another dual mode mobile station in the cellular frequency band will serve to demonstrate how the instant invention operates with respect to a cellular system.

Suppose a dual mode mobile station user in location area_1 180 wishes to place a call to a dual mode mobile station user in location area_2 185, specifically from a cell serviced by BTS 105 to a cell serviced by BTS 115. The call is transmitted from the dual mode mobile station to: (1) the base station servicing the cell (i.e., BTS 105, to BSC 125), (2) the MSC 140, (3) the PSTN network 175, specifically to the IEC (interexchange carrier) providing services to the calling dual mode mobile station, and (4) MSC 165, which is the home MSC for the calling dual mode mobile station. The home MSC for the calling dual mode mobile station, namely MSC 165, will send a message to HLR 160 of the called dual mode mobile station to retrieve information regarding where the called dual mode mobile station is currently located. The home MSC then attempts to locate the called dual mode mobile station using the last known location information (VLR identity) provided by the HLR 160. Specifically, the home MSC 165 sends a message over PSTN network 175, specifically over the IEC carrier providing services to the called dual mode mobile station, to the MSC servicing the current location area wherein the called dual mode mobile station is located, namely MSC 145. MSC 145 retrieves the location of the called dual mode mobile station from VLR 155.

The dual mode mobile station is then paged through all base stations (BSSs) served by MSC 145, because the exact location of the dual mode mobile station is unknown. In other words, BSC 130 and BTS 110 page one cell within location area_2 185, whereas BSC 135 and BTS 115 page another cell within location area_2 185. After it is determined that the dual mode mobile station of trucker 172 is located within the cell serviced by BTS 110, VLR 155 authenticates the dual mode mobile station and prepares for traffic channel encoding. After the dual mode mobile station answers, a traffic channel is selected and the connection is completed.

The embodiments (1) "System and Method for Cellular Control of Outbound Calls from a Mobile Station" and (2) "System and Method for Cellular Control of Inbound Calls to a Mobile Station", both described below, provide detailed explanations of specific modifications to the above standard cellular operation for enhancing the operation of a dual mode mobile station capable of operating in a cellular mode and in a UPCS mode.

B. UPCS Mode of Communications

Significantly, the instant invention provides each trucker with a dual mode mobile station that is not only capable of functioning in a cellular mode, but which is also capable of functioning in a UPCS mode.

UPCS is a lower-powered, higher-frequency technology than that of cellular technology. UPCS operates typically between 1910 and 1930 MHz, versus the 800–900 MHz range for typical cellular networks. A PCN (personal communications network) is the network associated with a UPCS technology.

Figure 2:
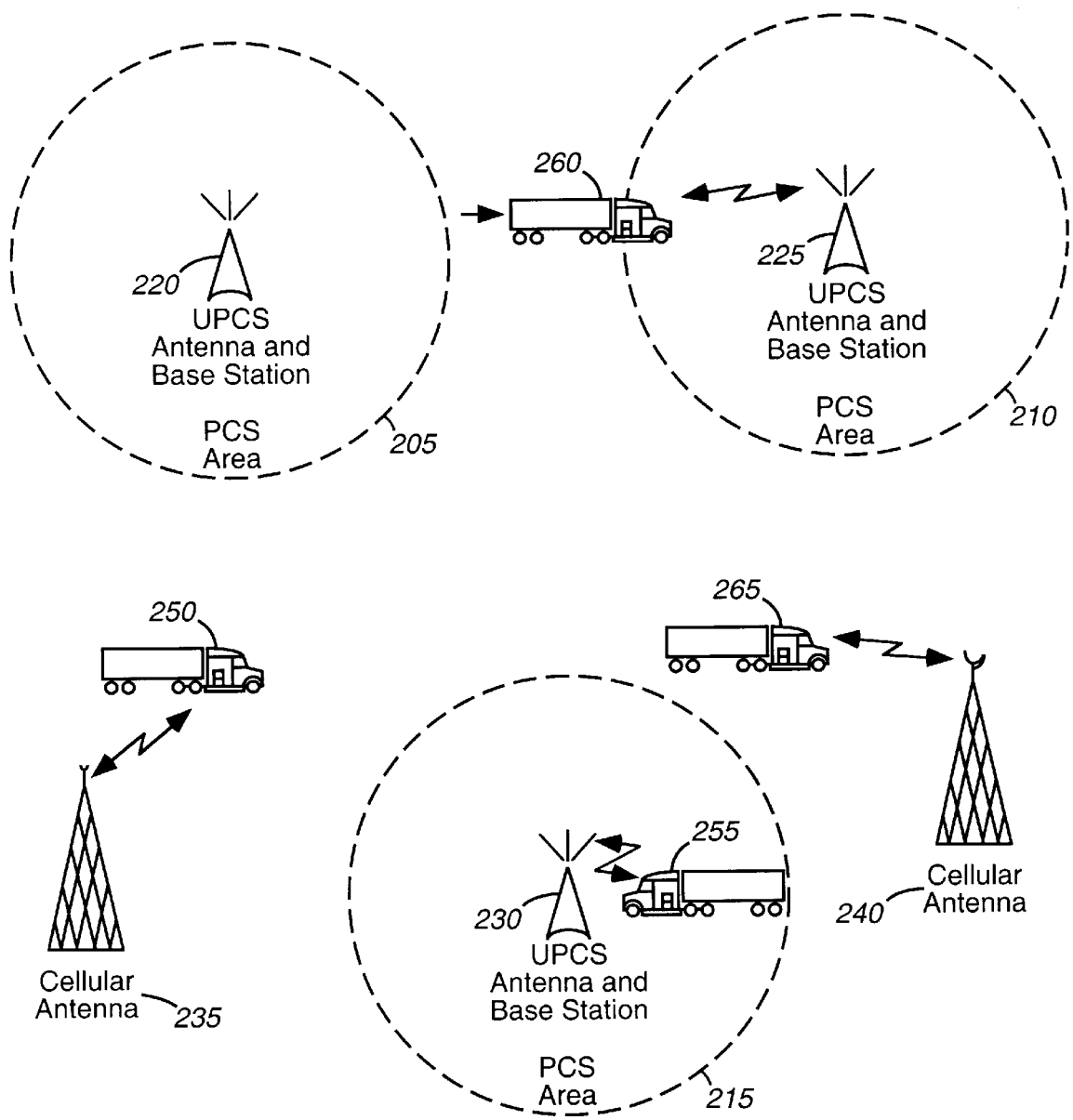
FIG. 2 is an exemplary illustration of an environment for the present invention, according to an embodiment of the present invention.

FIG. 2 is an exemplary illustration of an environment for the instant embodiment. To better illustrate the invention, the PCN is divided into a plurality of UPCS areas. FIG. 2 includes UPCS areas 205, 210 and 215, UPCS antenna(s) and base station(s) 220, 225 and 230, cellular antennas 235 and 240, and truckers 250, 255, 260 and 265, with each trucker bearing a single dual mode mobile station. The dual mode mobile station of each trucker 250, 255, 260 and 265 monitors the unlicensed UPCS radio bands for a beacon that has been transmitted from one of UPCS areas 205, 210 and 215.

The dashed lines around the UPCS areas 205, 210 and 215 represent the outer limits wherein beacons from these UPCS areas can be received with sufficient strength by a dual mode mobile station. Therefore, when a dual mode mobile station is within the dashed lines of one of UPCS areas 205–215, that dual mode mobile station is capable of transmitting or receiving communications via a UPCS mode in lieu of a cellular mode. (It should be noted that each UPCS area can have one or more UPCS antennas and base stations.)

Referring to FIG. 2, the dual mode mobile station for trucker 255 is within the dashed lines of UPCS area 215, indicating that the dual mode mobile station for trucker 255 can establish communication via UPCS antenna and base station 230. In the instant invention, when a switched-on dual mode mobile station is located within a UPCS area, the dual mode mobile station establishes UPCS communication instead of standard cellular communication. Therefore, the switched-on dual mode mobile station for trucker 255 will establish UPCS communication via UPCS antenna and base station 230, instead of establishing cellular communication via any of the Cellular antennas 235–240.

On the other hand, truckers 250 and 265 are out of range for receiving a transmitted beacon from any of UPCS areas 205–215. Since the dual mode mobile station of trucker 250 is located outside of any of UPCS areas 205–215, the dual mode mobile station for trucker 250 can only establish communication via Cellular antenna 235, which is an antenna corresponding to the cell within which the dual mode mobile station for trucker 250 is located. Similarly, the dual mode mobile station for trucker 265 can only establish communication via Cellular antenna 240 corresponding to the cell within which trucker 265 is located. Since trucker 260 is traveling into UPCS area 210, the dual mode mobile station for trucker 260 will establish communication with UPCS antenna and base station 225, providing there is a call being established in the cellular mode.

Figure 3:
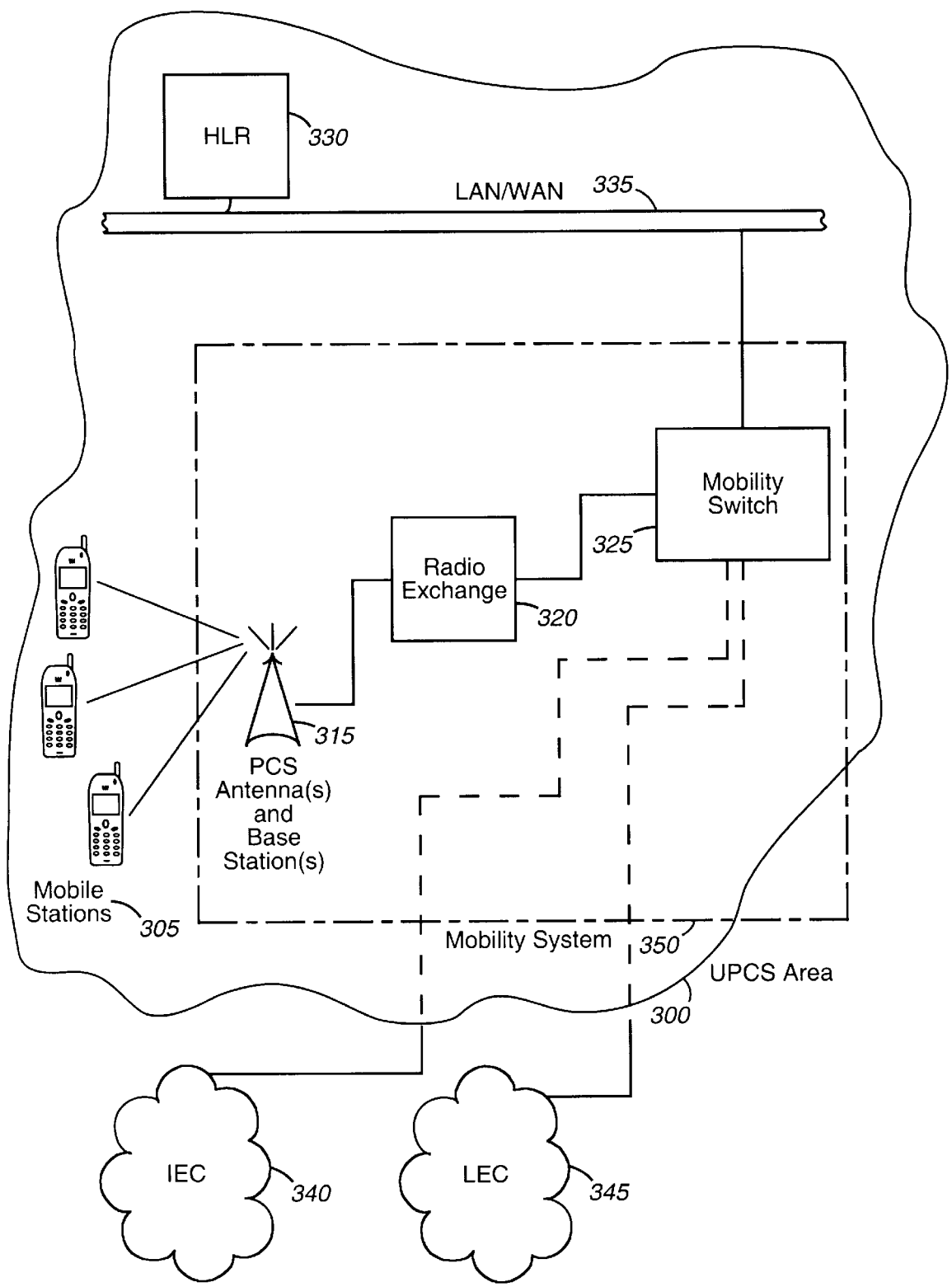
FIG. 3 is an exemplary illustration of a unlicensed personal service area, according to an embodiment of the present invention.

FIG. 3 is an exemplary illustration of a UPCS area. UPCS area 300 comprises one or more dual mode mobile stations 305, mobility system 350, LAN (local area network) 335, and HLR 330. Mobility system 350 comprises UPCS antenna(s) and base station(s) 315, radio exchange 320, mobility switch 325. UPCS area 300 has conventional telecommunications connectivity to IEC (inter-exchange carrier) 340, and LEC (local exchange carrier) 345 via mobility switch 325. An IEC is a long distance service provider, specifically, a provider authorized by the FCC to provide service between LATAs (local access and transport areas). A LEC is a local service provider, specifically, a provider authorized to provide service within a given LATA.

Each dual mode mobile station 305 has one or more North American numbering plan number(s), such as for example MINs (as discussed above), which are associated therewith for identification purposes. Other numbers can also be assigned for identification purposes, including ESNs (as discussed above) or other identification codes stored by the dual mode mobile station 305. The dual mode mobile station 305 is dual mode because it is capable of functioning in both the unlicensed UPCS frequency band in addition to a standard cellular frequency band.

Mobility system 350 provides wireless PBX (private branch exchange) functionality for UPCS area 300. A PBX is customer premise equipment that provides localized switching for a private customer. The mobility system (including UPCS antenna(s) and base station(s) 315, radio exchange 320, and mobility switch 325) handles dual mode mobile station registration and authentication, local facility switching, call debiting and monitoring, call supervision, and call routing for UPCS area 300. In addition, mobility system 350 (specifically the mobility switch 325) interfaces with IEC 340 and LEC 345. Hence, mobility system 350 controls the origination or destination of any UPCS call.

The following is a description of registration and authentication of a dual mode mobile station within a UPCS area. When a dual mode mobile station 305 is switched on within UPCS area 300, i.e., when dual mode mobile station 305 receives a beacon transmitted from UPCS antenna(s) and base station(s) 315, dual mode mobile station 305 will function in a UPCS mode. This requires authentication and registration of dual mode mobile station 305.

Dual mode mobile station 305 transmits an mobile identification number to UPCS antenna(s) and base station(s) 315. The dual mode mobile station mobile identification number is transmitted from UPCS antenna(s) and base station(s) 315 to mobility switch 325 via the radio exchange 320. Mobility switch 325 is connected to local area network/wide area network (LAN/WAN) 335. (As recognized by those of ordinary skill, the connection between mobility switch 325 and HLR 330 may be implemented by any conventional means, and not necessarily by a local area network or a wide area network.) In the instant example, mobility switch 325 may be connected to LAN 335 via a direct connection, an SS7 connection, a frame relay (X.25 enhancement protocol) connection, or another equivalent connection recognized by those of ordinary skill in the telephony and data communications art. The mobile identification number is then transmitted from mobility switch 325 to HLR 330 via LAN/WAN 335. HLR 330 will search a database to determine whether dual mode mobile station 305, as identified by its mobile identification number, is a valid dual mode mobile station. This authentication process can be performed according to methods known by those of ordinary skill in the art.

In one embodiment, in this authentication process a special algorithm is run by the dual mode mobile station. For example, HLR 330 can send a number which the dual mode mobile station 305 uses (along with its A-key) in order to run an algorithm and present an answer for comparison by the radio exchange 320, mobility switch 325, or the HLR 330, itself. If the expected answer is correct, then the dual mode mobile station 305 is then considered to be authentic and authorized to attach to the network.

If the authentication process is successful, then HLR 330 will update its database to reflect that dual mode mobile station 305 is currently located in UPCS 300.

In one embodiment, HLR 330 is separate and distinct from the cellular HLR 160 of FIG. 1. In this embodiment, HLR functionality (namely, locating a mobile headset upon the arrival of an inbound call) in the UPCS mode is separate and distinct from HLR functionality in the cellular mode. Here, the UPCS service provider uses one or more UPCS HLRs to store the location of a mobile headset in a given UPCS area.

In another embodiment, however, HLR 330 is the same entity as Cellular HLR 160 of FIG. 1. In this embodiment, the same HLR is used to store the location of a dual mode headset for both the UPCS band operation and the cellular band operation.

In the instant embodiment, queries and responses between the mobility switch 325 and HLR 330 are transmitted using an IS41 protocol, a protocol commonly used in cellular systems. However, those of ordinary skill will recognize that equivalent protocols may be used as well. The principal functions of HLR 330 are (1) to actively participate in the authentication of the dual mode mobile station 305 and (2) to maintain information regarding the last known location of dual mode mobile station 305 within UPCS area 300, if the dual mode mobile station were to receive an incoming call (as demonstrated below).

One important feature of the instant invention is that the dual mode mobile stations allow the user to establish communication using either a "private dialing plan" or regular PSTN debit services. A private dialing plan call refers to a call made to or received from a dialed number (i.e., a destination number) that has been pre-defined to the telecommunication services provider, i.e., to an IEC or to a LEC. In the instant embodiment, private dialing plan calls include calls made to destination callers and received from originating callers wherein the call has been previously authorized by the trucker's carrier company. Since private dialing plan calls have been previously authorized and, therefore, pre-defined to the service provider's network, in the instant embodiment such calls are billed in arrears to the trucker's carrier company and not to the trucker himself.

On the other hand, debit calls are calls made from a dual mode mobile station (outgoing calls) or calls received at a dual mode mobile station (incoming calls) that have not been authorized by the trucker's carrier company and pre-defined to the telecommunication system. Accordingly, debit calls are personal calls made using the dual mode mobile station and are billed to the dual mode mobile station user in advance. In the instant embodiment, the trucker uses a credit card to pay for such debit calls, though as recognized by those of ordinary skill, any form of advanced credit or payment option may be provided. The entity that authorizes acceptable originating and destination callers entitled to use the private dialing plan defined by the network of the telecommunications service provider, i.e., the trucker's carrier company in the instant embodiment, also has the capability of restricting certain calls such that a given dual mode mobile station cannot be used for making outgoing calls to, or receiving incoming calls from, a restricted destination number. These features of the instant invention will become more apparent in the description that follows.

One example of a private dialing plan is a VNet (virtual network) private dialing plan, which is a dialing plan privately defined for a customer at the customer's long distance carrier, e.g., MCI Telecommunications Corporation. A VNet call is a call by a customer having a VNet private dialing plan (recognized by the user's telecommunications provider) routed over a particular trunk group.

The telecommunications service provider must be able to distinguish a VNet call from a standard PSTN call. The VNet call may be distinguished in two ways. The first method of distinguishing a VNet call is to provide the customer a dedicated trunk group to the network facilities of a telecommunications service provider. For example, the telecommunications service provider may route a customer's private dialing plan calls over a FGD (feature group D) DAL (direct access line) trunk group from the customer's mobility switch to a network switch. FGD is the class of service associated with the modem equal-access arrangements, wherein the user may designate any long-distance provider. FGD provides all the IECs identical connections to the LEC switches, and gives customers a high quality of service, billing the user for the actual measured use in minutes. A VNet trunk group using a DAL connection may be termed a VNet/DAL trunk group and performs the same functions, but allows unique signaling to be used between the mobility system and the IEC switch.

The telecommunications service provider may also distinguish a VNet call by providing the customer a special access code. In this case, once the network switch receives an access number (i.e., a special "800" number), the caller receives a dial tone. The caller then dials a special VNet number that provides the caller access to a private virtual network. For this case, the VNet call may be routed over a shared trunk group, not necessarily a dedicated trunk group. A VNet call that uses special access may be termed a VNet/remote-access call.

It should be noted that with VNet, (1) users can dial private numbers or PSTN numbers, (2) private numbers can stay on-net ("on the network") or be translated to recognized PSTN numbers, (3) PSTN numbers can be translated to on-net or different PSTN numbers. A key relevance of the VNet to the instant invention is that despite how the call is dialed, routed, or translated, a VNet type is billed in arrears.

It is important to note that the instant invention is not limited to VNet calls, but encompasses any form of private dialing plan call, as recognized by those of ordinary skill. Hence, any method of distinguishing a private dialing plan call from a call wherein the calling parties are billed is included herein.

The numbers dialed by a private dialing plan user are recognized by the telecommunications service provider. But these private dialing plan numbers are not standard PSTN numbers, as discussed in further detail below, that are routed between LEC, IEC, cellular, and UPCS switches. For this reason, private dialing plan numbers are translated by the telecommunications service provider into valid PSTN numbers recognized by the standard telecommunications service providers. As defined further below, the private dialing plan numbers are recognized by an internal translation table or by an external routing and translation table of a telecommunications service provider switch.

1. An Outbound Call in a UPCS Communications Mode

The following is a description of outbound calls in a UPCS communications mode, specifically of: (1) an outbound private dialing plan call, and (2) an outbound debit call.

a. An Outbound Private Dialing Plan Call

The following is a description of an outbound private dialing plan call from a dual mode mobile station.

Since dual mode mobile station 305 has been registered in UPCS area 300, the location of the dual mode mobile station is known to or can be determined by the mobility system 350 (including UPCS antenna(s) and base station(s) 315, radio exchange 320, and mobility switch 325) for UPCS area 300. Specifically, the whereabouts of dual mode mobile station 305 are known to mobility switch 325.

Figure 4:
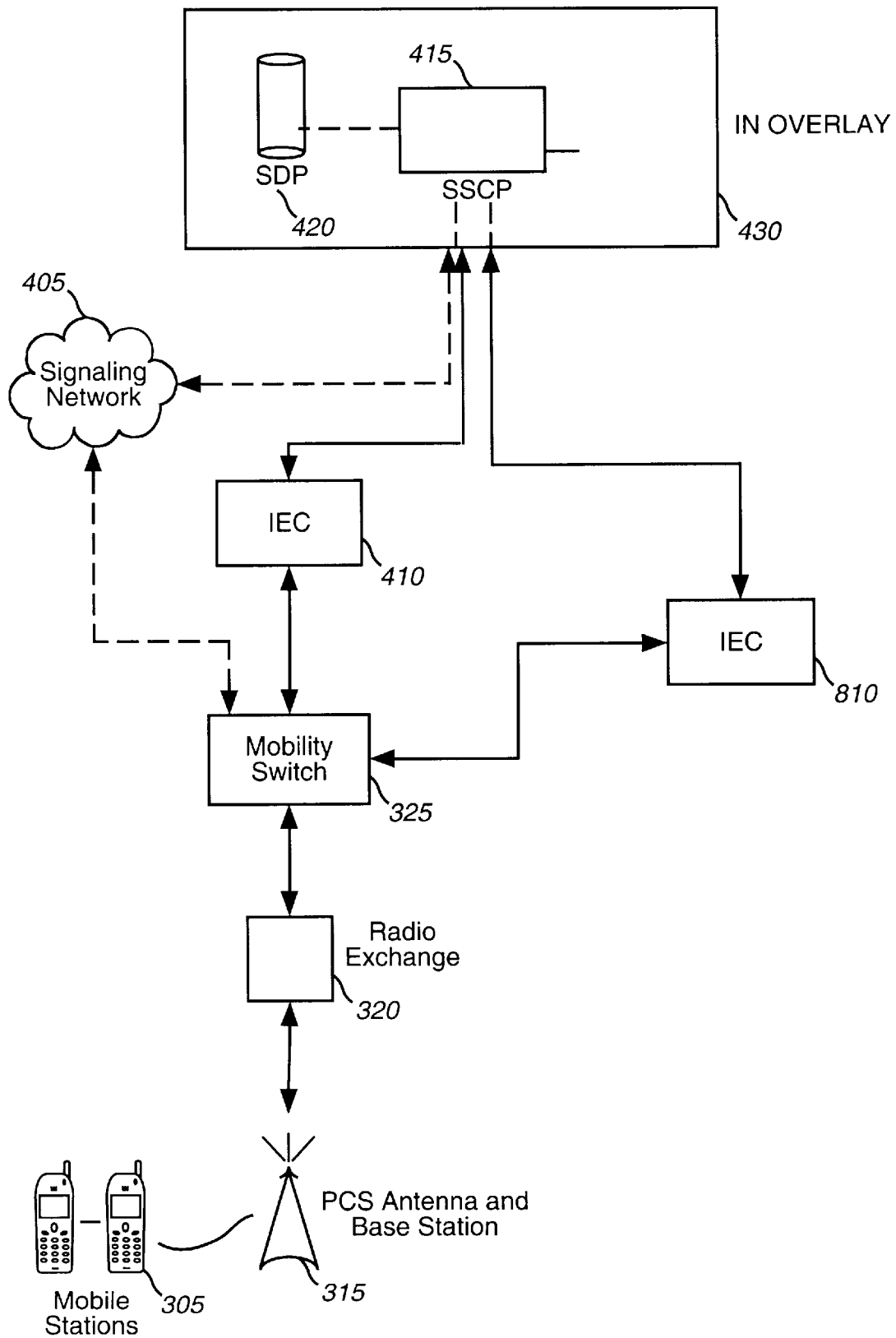
FIG. 4 is a block diagram illustrating the first portion of an outbound call from a dual mode mobile station.

FIG. 4 is a block diagram illustrating the first portion of an outbound call from dual mode mobile station 305. FIG. 4 includes dual mode mobile station 305, UPCS antenna and base station 315, radio exchange 320, mobility switch 325, signaling network 405, IEC switches 410 and 810, and intelligent network (IN) platform 430. IN platform 430 includes services data point (SDP) 420 and service switching control point (SSCP) 415. The IN platform 430, including SDP 420 and SSCP 415, is a specific type of advanced intelligent network (AIN), as recognized by those of ordinary skill. An AIN (or IN) permits a telecommunications service provider, as well as call originators and call receivers the ability to determine unique routing of a call and to provide each call with special features. SSCP 415 is a specialized digital telephone switch that queries SDP 420 for specific customer-related information in response to a specific command or service logic. SDP 420 is the database containing the customer-related information queried by SSCP 415.

When a user dials a destination telephone number from a dual mode mobile station 305, dual mode mobile station 305 outpulses: (1) the dialed number, and (2) the mobile identification number (e.g., an ANI, MIN, ESN, or a temporary identification allocated by the mobility switch 325 or radio exchange 320) to mobility switch 325 via UPCS antenna and base station 315 and radio exchange 320.

In response, mobility switch 325 transmits a "message set" to IN platform 430. The message set transmitted by mobility switch 325 contains three items of information: (1) the mobile identification number of the dual mode mobile station, (2) the destination telephone number, and (3) originating site information. The mobile identification number of the dual mode mobile station and the dialed number represent the same information, or a variation of the information, related from dual mode mobile station 305. The site information uniquely identifies UPCS area 300 and mobility switch 325 for proper call rating. Call rating refers to determining the cost of a call using the call distance (calculated from the location of the destination caller and the origination caller) and rates per-time established by the telecommunications services provider and accepted by the service-receiving customer.

The message set from mobility switch 325 is transmitted to an IN platform for the mobility switch. In the instant embodiment, mobility switch 325 transmits the message set, including the mobile identification number of the dual mode mobile station, the dialed number, and the UPCS area site information, to SSCP 415 of IN platform 430.

In addition, in the instant embodiment, mobility switch 325 may provide the address of SDP 420 in the outgoing message set. Signaling network 405 and SSCP 415 then route the message set to SDP 420 using the address of SDP 420. However, alternative methods of routing the message set from mobility switch 325 are also possible, as recognized by those of ordinary skill.

Figure 5:
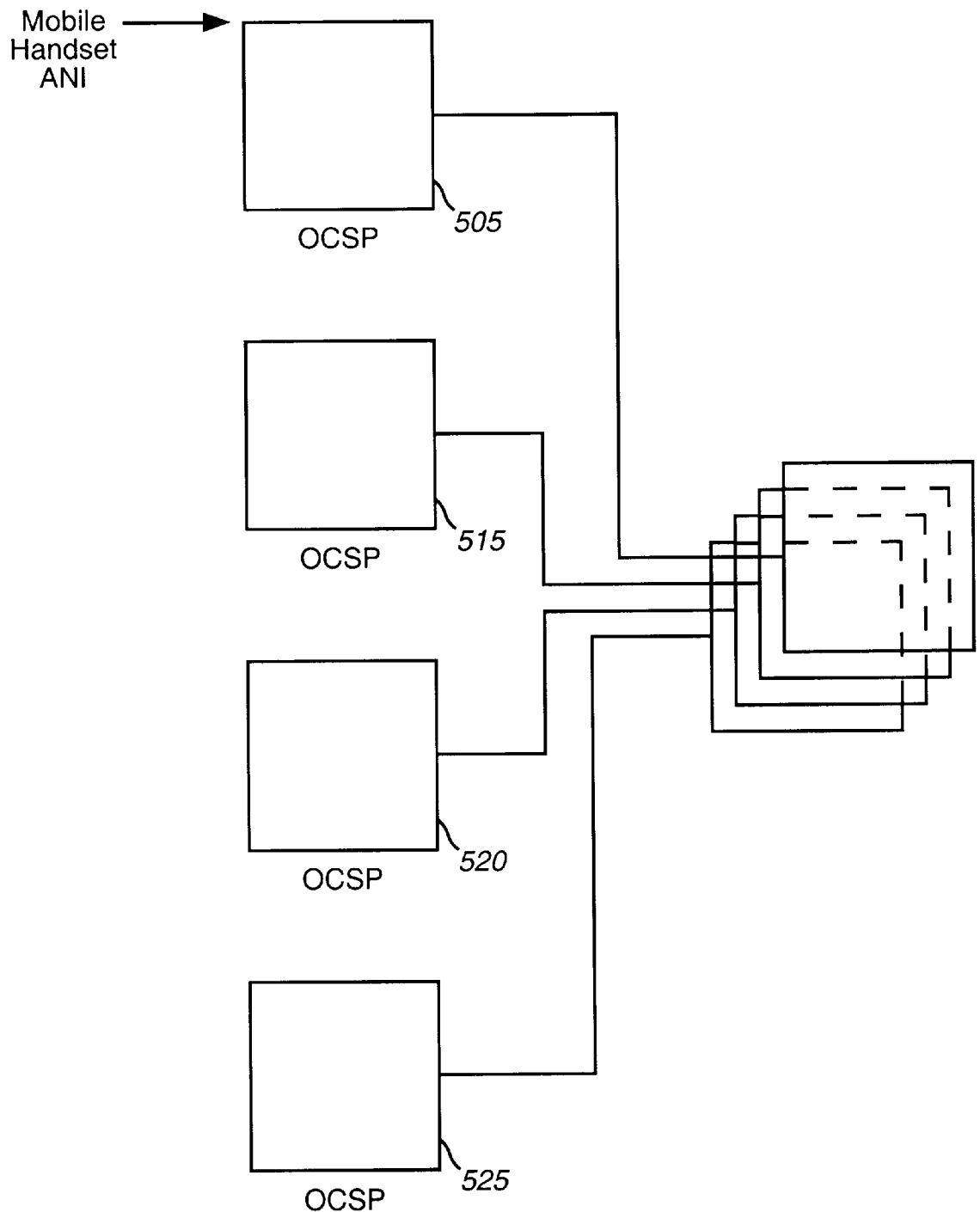
FIG. 5 is a block diagram illustrating an internal database of in an intelligent network platform comprising a series of outbound call-screening profile table.

FIG. 5 is a block diagram illustrating an internal database of SDP 420 comprising a series of outbound call-screening profiles (OCSPs). The database of SDP 420 illustrated in FIG. 5 includes OCSPs 505, 515, 520 and 525, which are respectively tables representing each dual mode mobile station, as explained in detail below. Hence, SDP 420 has an OCSP 505, 515, 520 and 525 representing each dual mode mobile station 305. After SDP 420 receives a message set from SSCP 415 that has been transmitted from mobility switch 325, SDP 420 uses the mobile identification number of the dual mode mobile station to find an appropriate outbound call-screening profile. As shown in FIG. 5, the mobile identification number of dual mode mobile station 305 uniquely designates OCSP 505 as the data table corresponding to dual mode mobile station 305.

The service logic program of FIG. 5 can be run in SSCP 415, wherein SSCP 415 queries SDP 420 to obtain specific data about the user and can also write to SDP 420. In another embodiment, SDP 420 itself provides part or all of the service logic program.

Figure 6:
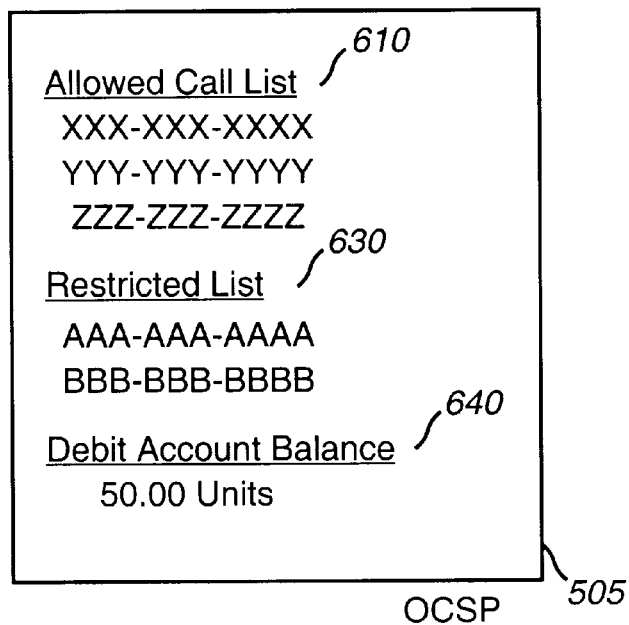
FIG. 6 is a detailed illustration of an outbound call-screening profile table representing a dual mode mobile station.

FIG. 6 is a detailed illustration of OCSP 505, which is an outbound call-screening profile table representing dual mode mobile station 305. OCSP 505 has an allowed call section 610, a restricted list section 630, and a debit account balance section 640. The allowed call section 610 includes telephone numbers XXX-XXX-XXXX, YYY-YYY-YYYY, and ZZZ-ZZZ-ZZZZ. The restricted list section 630 includes the telephone numbers AAA-AAA-AAAA and BBB-BBB-BBBBB. Since private dialing plan calls are permitted, the number of digits can be arbitrarily small or large. In addition, the invention permits ranges of numbers and wildcard numbers to be specified. The debit account balance section 640 includes a $50 amount. In should be noted that the invention permits a debit balance to be specified in generic units or minutes as well.

Figure 7:
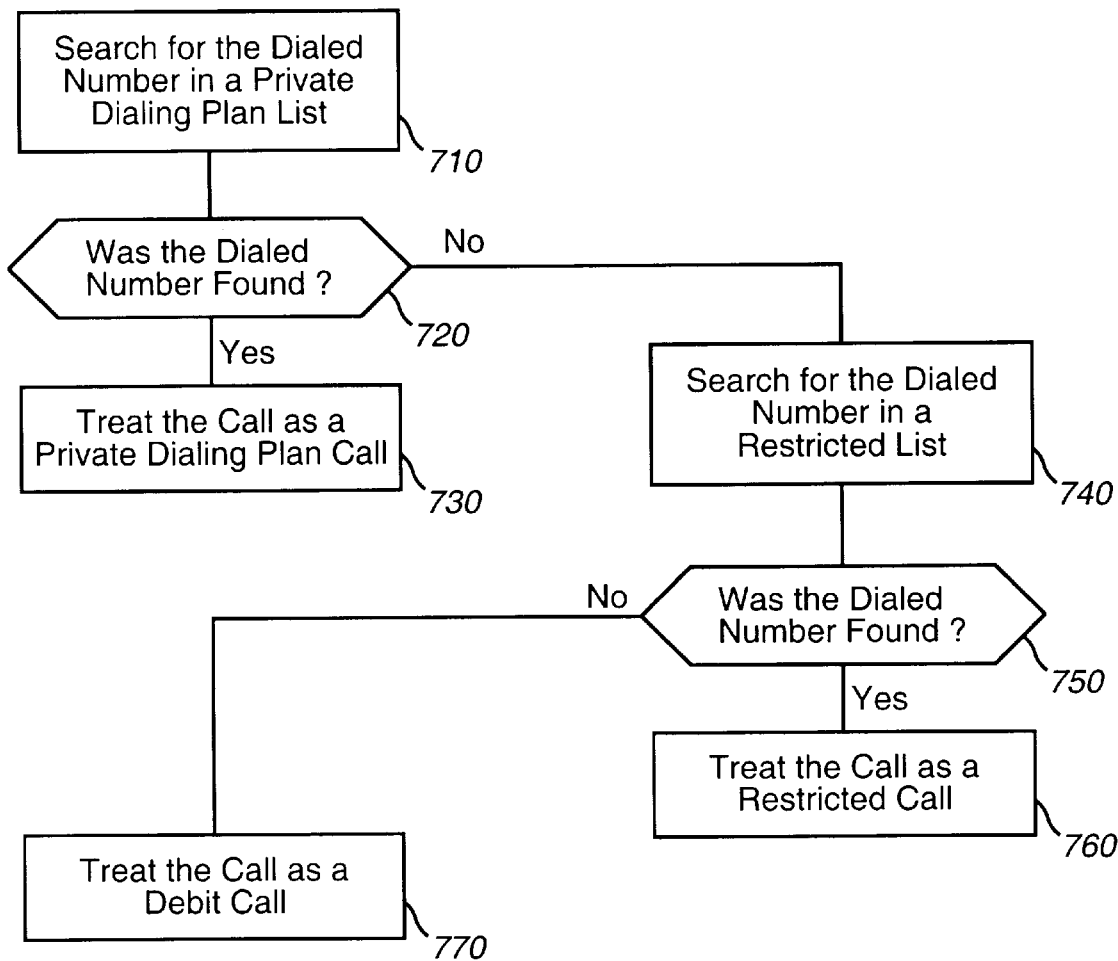
FIG. 7 is a flow chart detailing the operation of an intelligent network platform with respect to an outbound call received from a dual mode mobile station.

FIG. 7 is a flow chart detailing the operation of an SDP with respect to an outbound call received from a dual mode mobile station. Specifically, FIG. 7 depicts the operation of SDP 420 with relation to the outbound call received from dual mode mobile station 305. As mentioned, the mobile identification number of dual mode mobile station 305 has already been used to locate a corresponding outbound call screening profile, namely OCSP 505, as provided in FIG. 6.

In step 710, the number dialed by dual mode mobile station 305 (i.e., the destination number) is searched for a match in the allowed call section 610.

In step 720, if a match for the dialed number is located in the allowed call section 610, then in step 730 the outbound call is treated as a private dialing plan call. For example, suppose the number dialed at dual mode mobile station 305 is YYY-YYY-YYYY. SDP 420 searches allowed call section 610 of OCSP 505 for the number YYY-YYY-YYYY. Since the number YYY-YYY-YYYY is found in the allowed call section 610, the outbound call is treated as a valid private dialing plan call. (The remainder of FIG. 7 will be further described below in connection with an outbound call from a dual mode mobile station that is debited to the user of the mobile station.)

Referring to FIG. 4, when the SDP determines that the dialed number is a valid private dialing plan number, the SDP sends an instruction message back to the SSCP. The SSCP then sends a message back to the mobility switch. In the instant embodiment, when the dialed number YYY-YYY-YYYY is found in the allowed call section 610, then SDP 420 sends a message set back to the mobility switch 325 via SSCP 415 and signaling network 405. The message set sent from SDP 420 to SSCP 415 contains two instruction items. The first instruction item is to invoke private dialing plan call processing. The second instruction item is to provide a specific mobile identification number to be subsequently sent to the mobility switch 325.

A message is sent from SSCP 415 to mobility switch 325 containing three instruction items. First, SSCP 415 informs mobility switch 325 to retrieve an appropriate telecommunications circuit for routing of the call. Second, SSCP 415 informs mobility switch 325 to send the mobile identification number specified in the message to an appropriate switch connected thereto, i.e., to a switch along the designated circuit. Third, SSCP 415 directs mobility switch 325 to outpulse the dialed number to this same switch.

Figure 8:
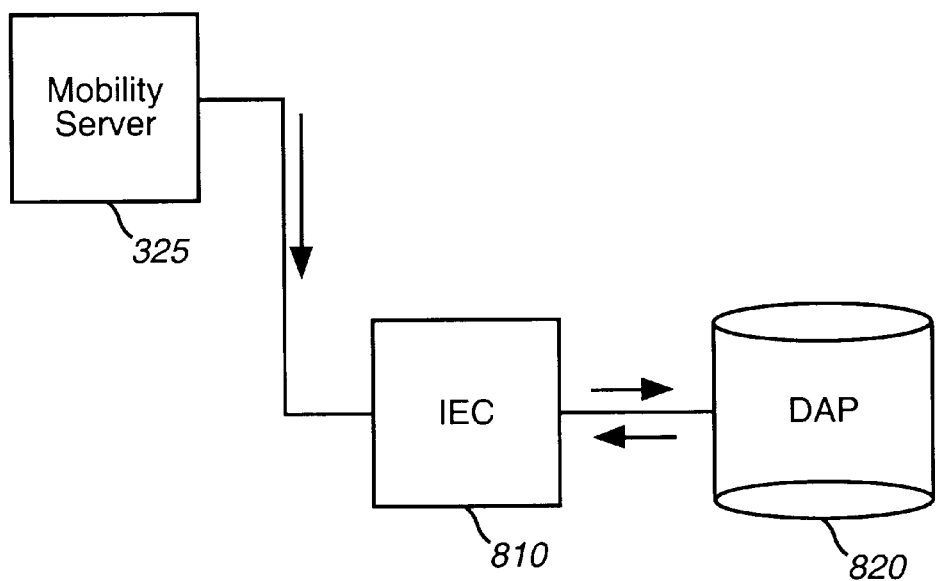
FIG. 8 is a block diagram illustrating the relationship between a mobility server and a sample telecommunications network that handles an outbound private dialing plan call.

FIG. 8 is a block diagram illustrating the relationship between the mobility switch and a sample telecommunications network that handles an outbound private dialing plan call. FIG. 8 includes mobility switch 325, IEC switch 810, and DAP (data access point) 820.

Figure 9:
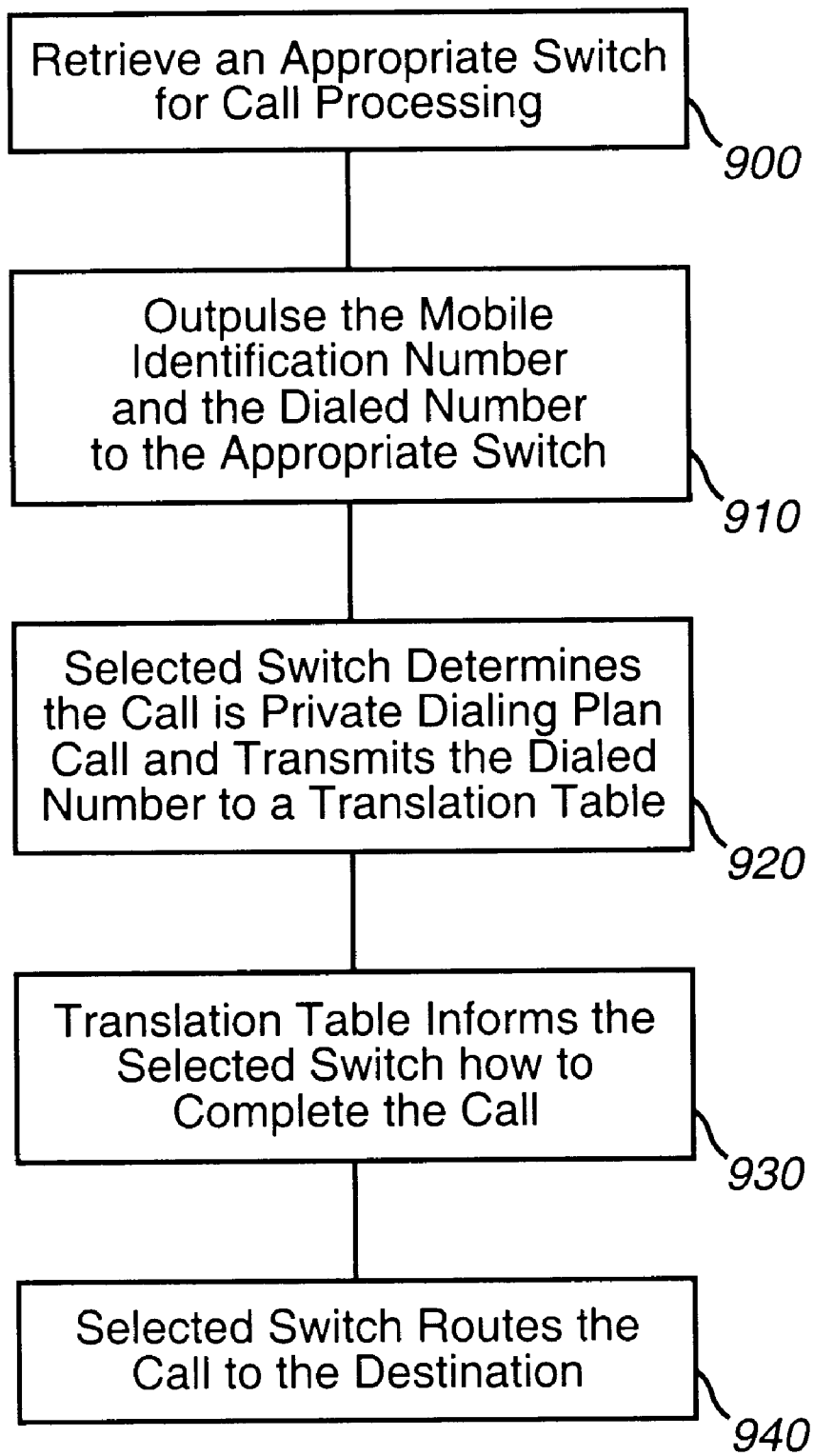
FIG. 9 is a flowchart illustrating the sequence of steps carried out in routing a private dialing plan call.

FIG. 9 is a flowchart illustrating the sequence of steps carried out in routing a private dialing plan call, after a message set is received from the SSCP 415. The steps of FIG. 9 are best understood with respect to the block diagram of FIG. 8.

In step 900, mobility switch 325 retrieves an appropriate switch trunk group for processing the outbound call from dual mode mobile station 305. In the instant embodiment, mobility switch 325 designates a trunk group for IEC switch 810 for call routing.

In step 910, mobility switch 325 outpulses the mobile identification number specified by the SDP 420 and the dialed number to the appropriate switch. In the instant embodiment, the mobile identification number specified by the SDP 420 and the dialed number are transmitted to IEC switch 810. In the instant embodiment, mobility switch 325 outpulses YYY-YYY-YYYY to IEC switch 810.

In step 920, the selected switch determines that the call is a private dialing plan call and transmits the dialed number to a translation table in order to translate the private dialing plan telephone number into a PSTN number recognized by the telecommunications provider. Specifically, in the instant embodiment, IEC switch 810 determines that the call is a VNet call and transmits the dialed number received to DAP 820.

As noted to above, a switch designated to handle an outbound call must translate the private dialing plan number to a number that is recognized by the switches of the telecommunications provider. Generally, a private dialing plan number (e.g., a VNet number) is a number that is dialed by a customer and recognized by the telecommunications service as belonging to that customer. After the customer dials the private dialing plan number, the private dialing plan number is routed to the telecommunications service provider, or more specifically, to a telecommunications switch used by the telecommunications service provider for handling private dialing plan telephone calls. However, the private dialing plan telephone number is not necessarily in a form that is acceptable for routing between the telecommunication provider's network elements. Therefore, the telecommunications service provider must translate the private dialing plan telephone number into a form that is recognizable by its network elements, namely, into a recognizable number. The number is routed between from the telecommunications service provider's switches to the destination caller.

In FIG. 8, IEC switch 810 handles private dialing plan calls transmitted from mobility switch 325. In order to translate the private dialing plan telephone number into a PSTN telephone number, i.e., a telephone number that is recognizable by the telecommunication provider's switches, IEC switch 810 transmits the mobile identification number specified by SDP 420 and the dialed number to DAP (data access point) 820. A DAP is one form of an externally-located routing and translation table used by IEC switches to aid in routing a call. A DAP is a facility that receives an information request from an IEC switch, processes the request, and returns requested information or instructions back to the requesting IEC switch.

For purposes of the instant invention, it is not necessary that a telecommunications switch handling a UPCS call from a mobility switch use an external routing and translation table such as a DAP when it receives a private dialing plan telephone number. The switch receiving a private dialing plan telephone number may provide its own in-switch translation of the private dialing plan telephone number into a PSTN telephone number without routing the call externally. For example, IEC switch 810 may perform an in-switch translation of the private dialing plan telephone number YYY-YYY-YYYY into a telephone number recognized by the telecommunications service provider's switches.

In step 930, the translation table that has received the private dialing plan telephone number informs the selected switch how to complete the call. In the instant embodiment, DAP 820 outpulses a telephone number recognized by the switches of the telecommunications service provider to IEC switch 810.

In step 940, the selected switch routes the call to the appropriate destination.

Figure 10:
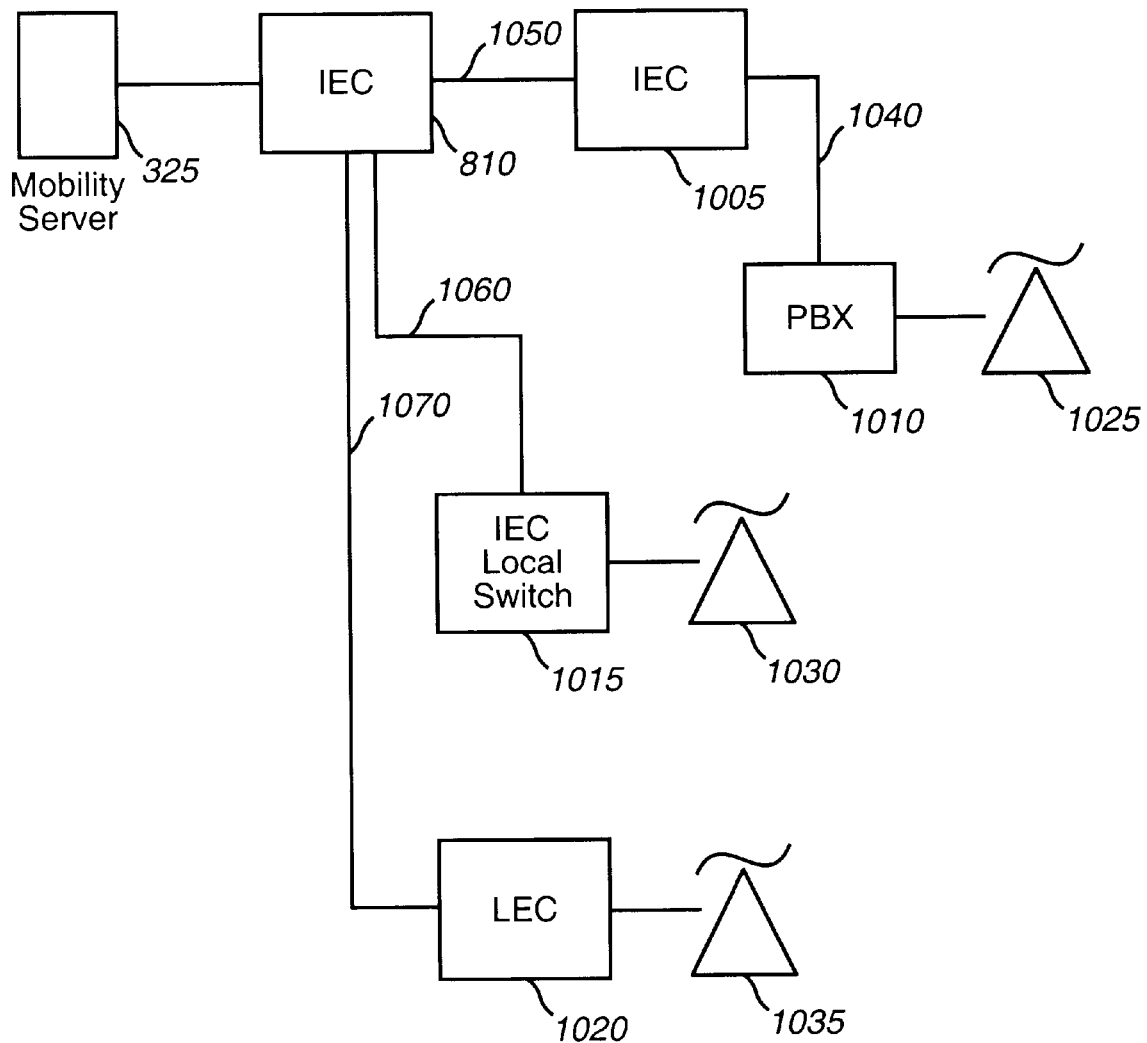
FIG. 10 is a block diagram illustrating how an outbound call can be routed from a designated switch.

FIG. 10 is a block diagram illustrating how the call can be routed from the designated switch. Specifically, FIG. 10 illustrates three potential paths that the call may traverse from IEC switch 810, which switch had been designated for call routing by mobility switch 325.

Path 1050 illustrates the call being routed from IEC switch 810 to another IEC switch 1005. IEC switch 1005 routes the call over a DAL to PBX 1010. PBX 1010 then rings the destination caller 1025. When destination caller 1025 answers the telephone or handset, a voice channel is established between dual mode mobile station 305 and the destination caller 1025.

Path 1060 illustrates a call being routed from IEC switch 810 to IEC local switch 1015. IEC local switch 1015 routes the call to destination caller 1030, wherein the telephone is rung and a voice channel is established after the telephone is answered. Recent tariff guidelines established within the United States allow a long-distance carrier to provide a local switch within a LATA (local access and transport area). Therefore, an IEC local switch, such as IEC local switch 1015, may compete for services with existing LEC switches.

Path 1070 illustrates a connection between IEC switch 810 and a LEC, specifically with LEC switch 1020. The call is routed to a POP (point-of-presence), and subsequently routed to LEC switch 1020, for establishing communication with destination caller 1035. As described above, a voice channel is established after destination caller 1035 answers the telephone.

b. An Outbound Debit Call

The following is a description of an outbound call from a dual mode mobile station that is debited to the dual mode mobile station user.

The first leg of the call, namely, sending the mobile identification number specified by the SDP 420, the dialed number, and the UPCS area site information to the appropriate switch is the same as for an outbound private dialing plan call. Therefore, the mobility switch 325 transmits the mobile identification number specified by the SDP 420, the dialed number, and the UPCS area site information to IEC switch 410.

Turning again to FIG. 7, in step 710, the number dialed by dual mode mobile station 305 is searched for a match in the allowed call section 610.

In step 720, since no match for the dialed number is located in the allowed call section 610, control is passed to step 740.

In step 740, it must be determined whether the number dialed from the dual mode mobile station is restricted. Specifically, the number dialed from the dual mode mobile station 305 is searched in the restricted list section 630 of SDP 420. Control is passed to step 750.

In step 750, if it was determined in step 740 that the dialed number is found in the restricted list, then control is passed to step 760. In step 760, the user is prevented from transmitting a call where the destination indicated by the dialed number is restricted. For example, the user's carrier company (who owns the dual mode mobile station 305) may update the restricted list section 630 to prohibit the user from making a call to a given destination.

Optionally, if the dual mode mobile station user attempts to place a call to a destination number located in the restricted list section 630, then SSCP 415 may send a message set indicating this condition to mobility switch 325, which in turn will make the user aware that the dialed number is a restricted number.

Steps 740 and 750, i.e., to restrict the dialed number if the dialed number is found in restricted list 630, comprise optional steps that may be bypassed, as recognized by those of ordinary skill.

In step 750, if it is determined that the dialed number is not restricted, or optionally, if restriction is not performed, then control is passed to step 770. In step 770, the call is to be treated as a debit call.

Figure 12:
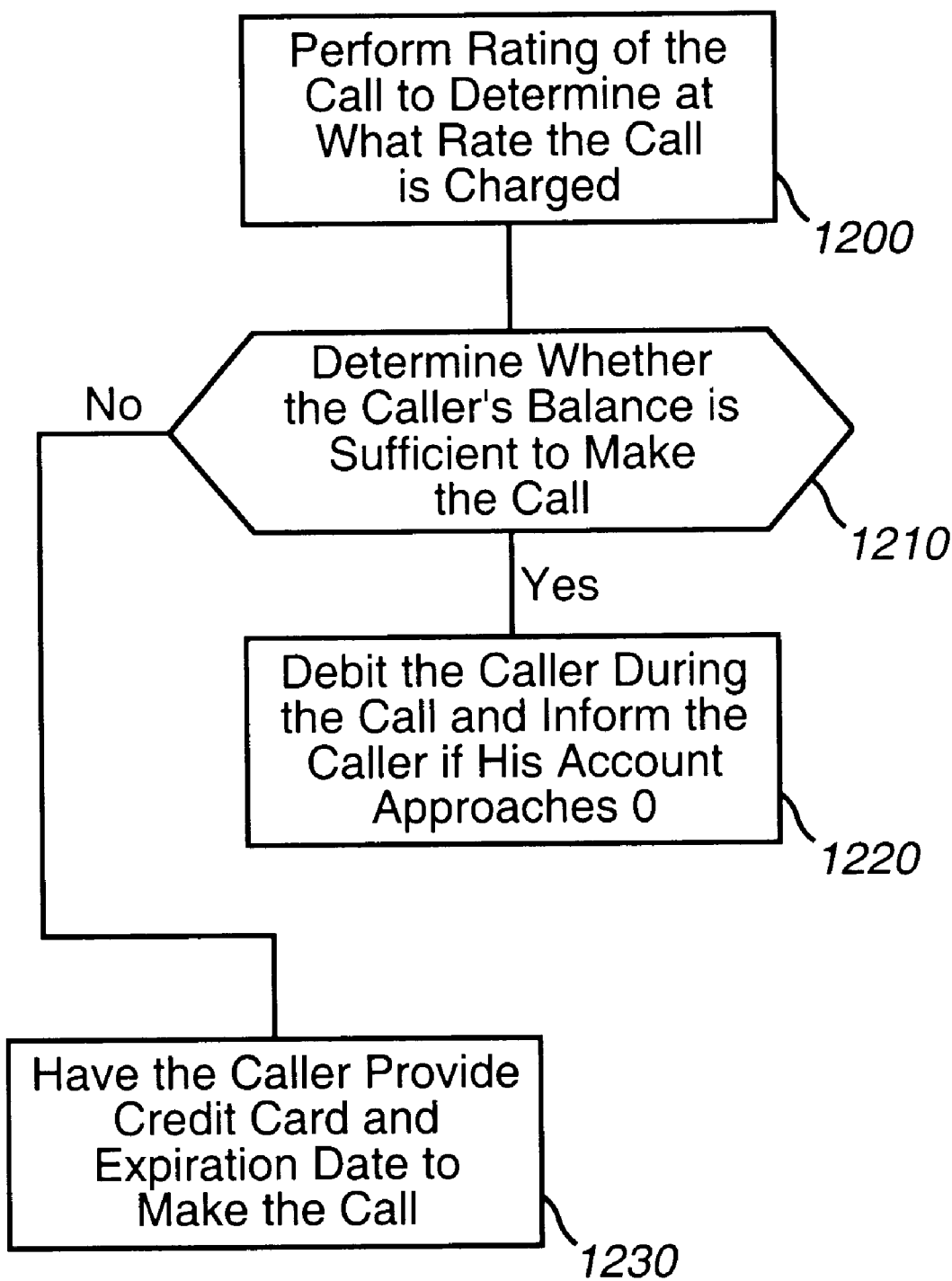
FIG. 12 is a flowchart illustrating the operation of an outbound debit call.

FIG. 12 is a flowchart illustrating the operation of an outbound debit call. In step 1200, call rating is performed. As briefly noted above, call rating is a procedure used to determine at what rate to bill the call. Call rating requires applying pre-determined time-based billing rates to the distance between the originating caller and the destination caller. If the distance is unknown (or insignificant), then the call is rated at a flat rate.

In step 1210, it is determined whether the user's balance is sufficient to complete the call. Specifically, SDP 420 determines whether the credit balance associated with the dual mode mobile station is sufficient to complete the call. Referring to FIG. 6, as a first step SDP 420 searches the debit account balance section 640 of OCSP 505 to determine whether the caller has previously paid for sufficient funds to place the call. In the instant embodiment, SDP 640 determines that the user using dual mode mobile station 305 has previously paid for $50.00 worth of telephone calls. If $50.00 is sufficient to permit the caller using dual mode mobile station 305 to place the call for a minimum threshold number of minutes, then the user is permitted to complete the call.

On the other hand, if the debit account balance section 640 indicates that the user using dual mode mobile station 305 has insufficient funds to complete the call, then the caller using dual mode mobile station 305 is provided the opportunity to make an advanced form of payment.

For one example, a voice instruction or some other indicator will cue the user to enter his credit card number and credit card expiration date. If the credit card number and credit card expiration date are valid numbers, and if the caller has sufficient funds on the credit card, then the caller's credit card is debited for the requested amount. Those of ordinary skill in the art recognize how to implement credit card acceptance and validation.

For another example, the caller purchases credits at a kiosk, using either a credit card or a calling card provided by a telecommunications services provider. The caller also provides identification information (e.g., mobile identification number of the dual mode mobile station) at the kiosk. In this example, the kiosk is connected to IN platform 430, which automatically credits the debit account balance associated with the caller's dual mode mobile station. Since the kiosk is connected to IN platform 430, specifically SDP 420, IN platform 430 automatically credits the debit account balance section 640 associated with the OCSP 505 of dual mode mobile station 305.

As recognized by those of ordinary skill, other forms of advance payment provided by the dual mode mobile station user are acceptable as well.

In step 1220, the dual mode mobile station user's debit account balance is decremented during the call and the caller is informed in the event that his debit account balance approaches zero or some other arbitrary threshold. The length of the call is monitored in real time to ensure that the caller does not exceed the debit account balance. For example, for dual mode mobile station 305, the debit account balance is provided in the debit account balance section 640 of OCSP 505. Therefore, once it is determined that the destination caller dialed by the dual mode mobile station user is not a restricted number and that the user has sufficient funds to place the call, SDP 420 monitors the debit account balance for the dual mode mobile station.

For an outbound debit call, since no private dialing plan is used, the translation of the dialed number to a PSTN number, as provided in relation to FIG. 8, is unnecessary. The dialed number is used by the telecommunications service provider to route the call to an appropriate destination. Therefore, routing of the call is the same as described with relation to FIG. 10 above.

Figure 11:
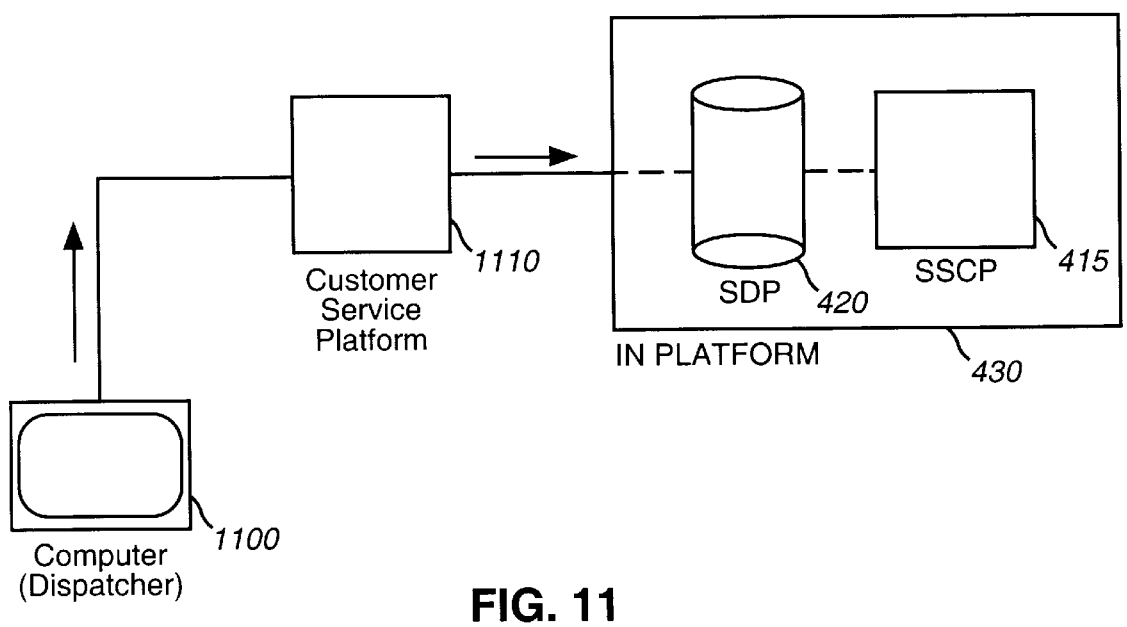
FIG. 11 is a detailed description illustrating how databases of an intelligent network platform are updated.

2. How a Customer May Designate a Call as a Private Dialing Plan Call or a Restricted Call FIG. 11 is used to show how a customer may designate a call as a private dialing plan call or as a restricted call. Specifically, FIG. 11 is a detailed description illustrating how the databases of the IN platform 430 are updated. The VNet customer (i.e., in this case a fleet carrier) is provided a computer connected to the IN platform 430, for providing updates to the databases incorporated within the IN platform 430.

In the instant embodiment, the user's company (e.g., the trucker's carrier company) has a telecommunications administrator who oversees employee communications usage. The administrator uses computer 1100 as an interface with customer service platform 1110. A human or machine user invokes a database updating program on an application running on computer 1100. The application running on computer 1100 transmits an update request to customer service platform 1110. In response, customer service platform 1110 transmits an update request to SDP 420 included within IN platform 430. The request for database updating may occur in real-time or in a batch processing mode. In another embodiment, computer 1100 bypasses the customer service platform 430 and establishes direct connection with SDP 420.

In this matter, the entity that authorizes available private dialing plan calls, e.g., the user's company, may update the allowed call section 610 and the restricted list section 630 of FIG. 6. In other words, the user's carrier company can indicate the telephone numbers available to the user for private dialing plan calls, in addition to the telephone numbers not available to the user from the dual mode mobile station.

If the user desires to call a telephone number not indicated as a private dialing plan call (i.e., the telephone number is not located in the allowed call section 610), which is not a restricted number (i.e., the telephone number is not located in the restricted list section 630), then the call may be debited to the mobile station user.

3. An Inbound Call in a UPCS Communications Mode

Figure 13A:
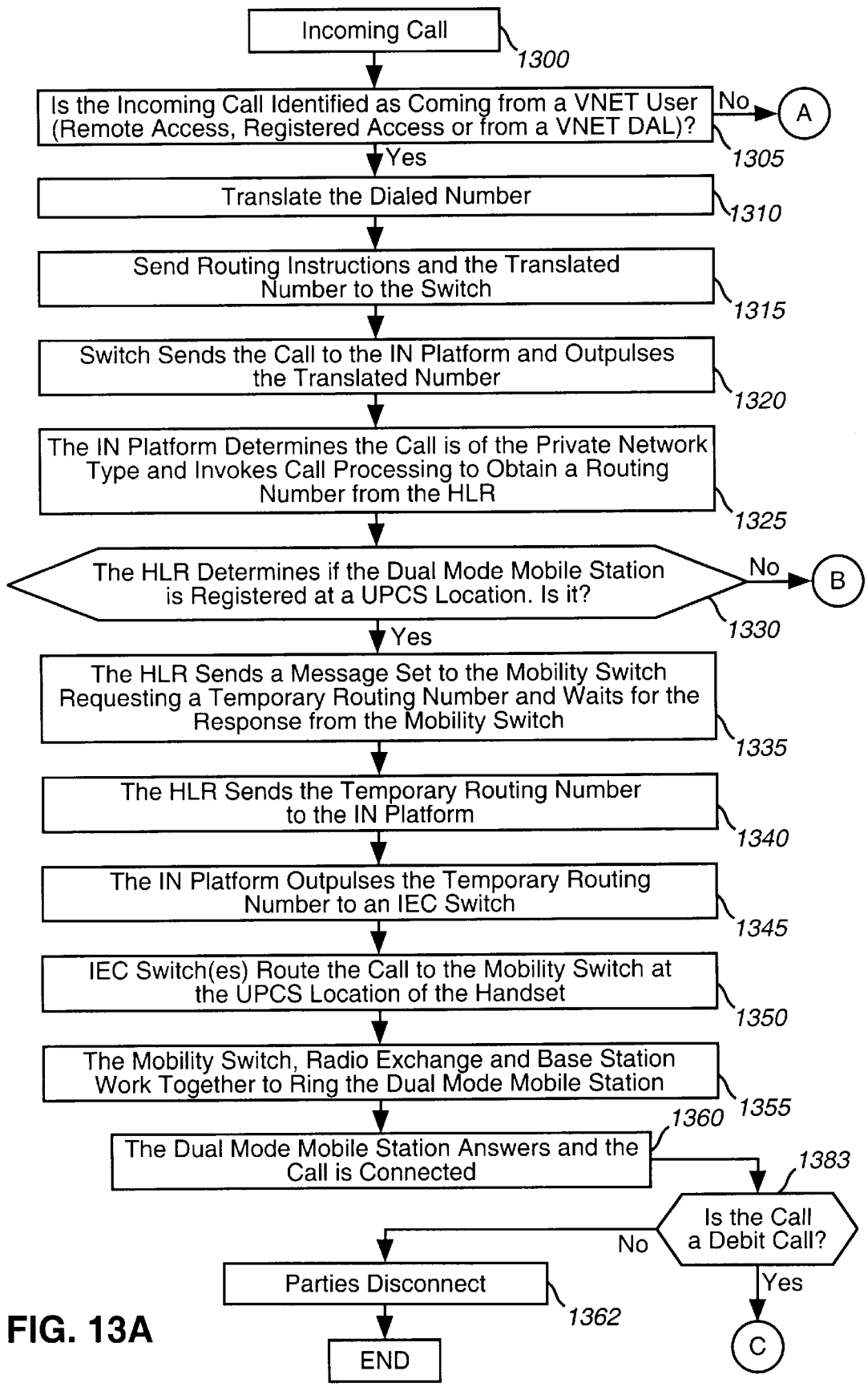
FIGS. 13A, 13B and 13C are flow charts illustrating the operation of an inbound call to a dual mode mobile station in an unlicensed personal communications service mode.
Figure 13B:
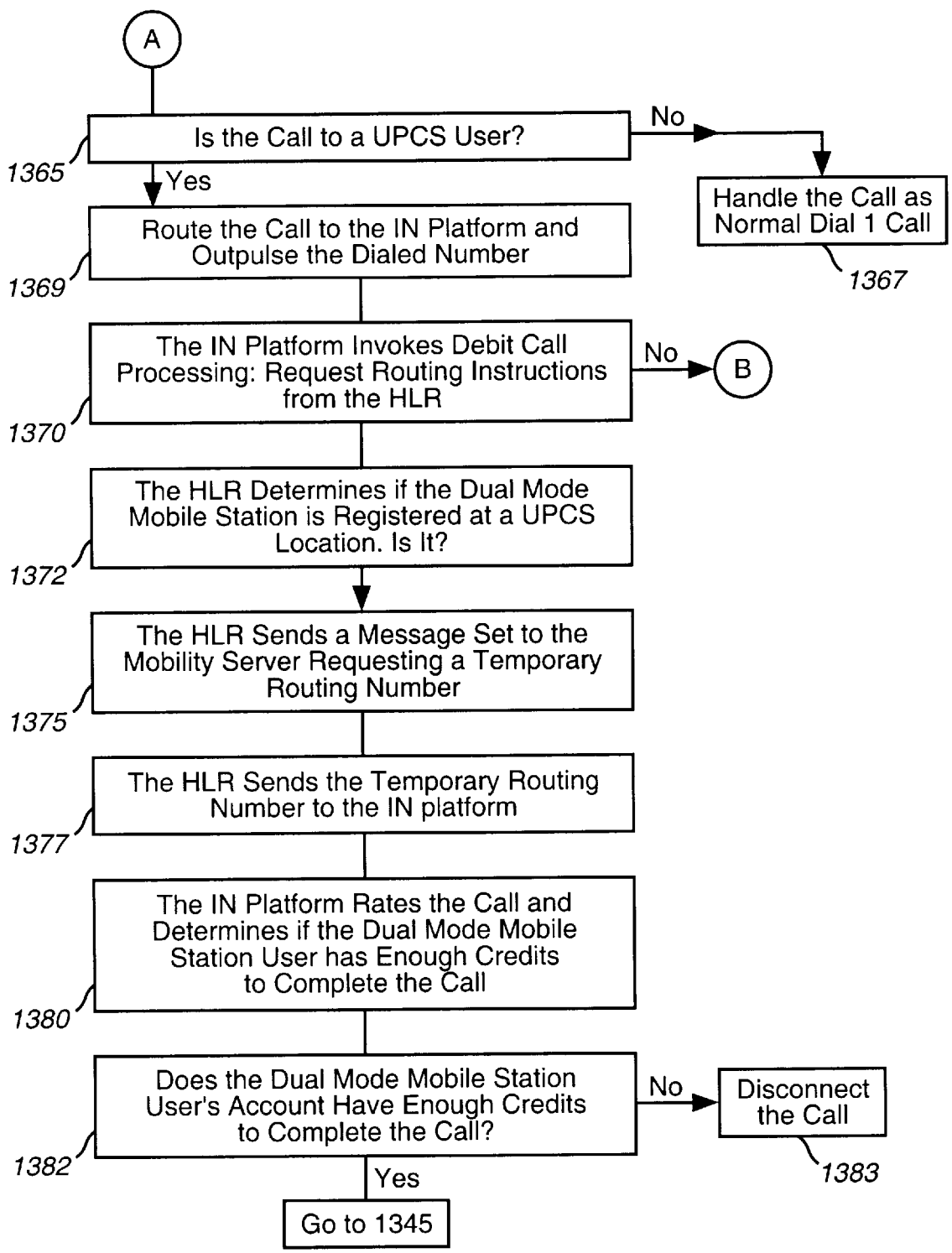
Figure 13C:
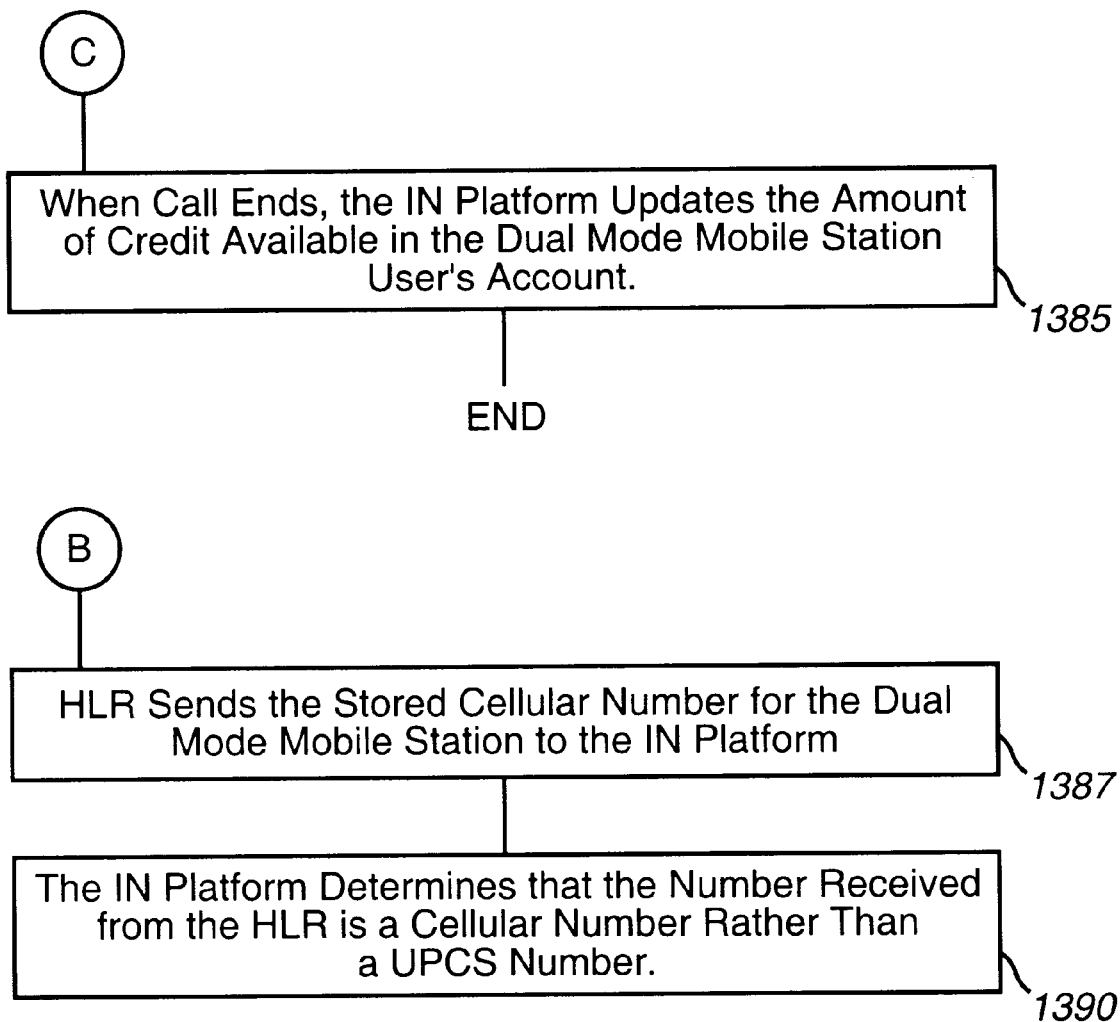

The following is a description of an inbound call to a dual mode mobile station in the UPCS mode. FIGS. 13A–13C are flow charts illustrating the operation of an inbound call to a dual mode mobile station in a UPCS mode.

In step 1300, an incoming call is originated by an originating caller. In step 1305 it is determined whether the call is a private dialing plan call. For a VNet call, it is determined whether the call is a remote access call, a registered access call, or a call from a VNet DAL, as explained below.

As mentioned, for a VNet, the call can be distinguished in three ways from a PSTN call: (1) the call may be routed over a DAL designated for a private dialing plan customer, and (2) the caller may be required to dial a special access code, followed by a VNet number, or (3) the IEC switch recognizes the mobile identification number of the calling phone as belonging to a VNet customer.

Referring again to FIG. 10, originating caller 1025 may obtain VNet access to IEC switch 1005 via PBX 1010 and DAL 1040. Every call placed over DAL 1040 is a VNet call.

Alternatively, a hypothetical VNet caller may obtain access to VNet service by dialing a special VNet access number, followed by a VNet number. Specifically, originating caller 1035 may obtain access to IEC switch 810 through LEC switch 1020 over route 1070 by dialing a special "800" access number. IEC switch 810 then returns a dial tone to originating caller 1035. At that point, originating caller 1035 dials a special VNet number, which is routed to IEC switch 810. If IEC switch 810 has VNet capability, then IEC switch 810 will handle the VNet call. Alternatively, IEC switch 810 may route the call to another switch that has VNet capability, such as IEC switch 1005.

Alternatively, a hypothetical VNet call may obtain service by dialing a 700-XXX-XXXX number. LEC switch 1020 determines by the dialed 700 -XXX-XXX number to route the call, along with the dialed number and the dual mode mobile station's mobile identification number, to IEC switch 810 using shared trunk group 1070. IEC switch 810 then determines whether the call is a VNet call depending upon the mobile identification number.

If it is determined that the call is not a private dialing plan call, then control passes to step 1365 in FIG. 13B.

Otherwise, if it is determined that the call is a private dialing plan call, then in step 1310 the number provided by the dual mode mobile station is translated, and in step 1315 routing instructions and the translated number are sent to the appropriate switch, e.g., IEC switch 810.

In step 1320, IEC switch 810 sends the call to the IN platform 430 (see FIG. 4) and outpulses thereto the translated number. In step 1325, IN platform 430 determines the call to be a private dialing plan call using the translated number, and further invokes call processing to obtain a routing number from the HLR. In the instant embodiment, as shown in FIG. 4, IEC switch 810 sends a message set that includes the dialed number to SSCP 415 of IN platform 430. SSCP 415 then queries HLR 330 in order to determine the current location of the mobile station being called.

In step 1330, HLR 330 determines whether the dual mode mobile station is registered at a UPCS location. In one embodiment, the HLR 330 searched for the location of the dual mode mobile station when the dual mode mobile station operates in a UPCS mode is the same as the HLR 160 searched for the location of the dual mode mobile station when the dual mode mobile station operates in a cellular communications mode. Specifically, in this embodiment HLR 330 for the UPCS areas is the same as HLR 160 used for cellular communication, so that SSCP 415 routes the query to a singular HLR.

If HLR 330 is not registered at a UPCS location, then control is passed to step 1387 (FIG. 13C). In that step, HLR 330 sends the stored cellular number for the dual mode mobile station to the IN platform 430. Subsequently, in step 1390 IN platform 430 determines whether the number received from the HLR 330 is a cellular number. This is an important determination, because the rate for completing a call in a cellular mode may be different from the rate for completing a call in a UPCS mode.

If in step 1330 (FIG. 13A) it is determined that the dual mode mobile station is registered to a UPCS location, then in step 1335 HLR 330 sends a message set to mobility switch 325 requesting a temporary routing number and subsequently waits for a response from mobility switch 325. In step 1340, HLR 330 sends the temporary routing number (received from mobility switch 325) to IN platform 430.

In step 1345, IN platform 430 outpulses the temporary routing number to appropriate IEC switch or switches. In this case, the temporary routing number is sent to IEC switch

410. In step 1350, IEC switch 410 then routes the call to the mobility switch 325 (at the UPCS location of the dual mode mobile station).

In step 1355, mobility switch 325, radio exchange 320, and antenna and base station 315 work together to ring the dual mode mobile station 305.

In step 1360, the user answers the dual mode mobile station and the call is connected.

In step 1383, if it is determined that the call is a debit call, then control is passed to step 1385 (FIG. 13C). In step 1385, IN platform 430 determines when call disconnection occurs (i.e., when the call ends) and updates the amount of credit available to the dual mode mobile station. Referring to FIG. 6, debit account balance section 640 is adjusted accordingly.

In step 1362, the calling parties end the call and the connection is terminated.

The following is an explanation of what happens if in step 1305 it is determined that the call is a debit call. Referring to FIG. 13B, in step 1365 it is determined whether the call is to a UPCS user. If the call is not to a UPCS user, then in step 1367 the call is handled as an ordinary dial one (PSTN) call.

If the call is to a UPCS user, then in step 1369 the switch handling the call (in this case IEC switch 810) routes the call to IN platform 430, in addition to outpulsing thereto the dialed number.

In step 1370, IN platform 430 determines the call to be a debit call using the translated number, and further invokes call processing to obtain a routing number from the HLR. Similarly to the above discussion of FIG. 13A, as shown in FIG. 4 IEC switch 810 sends a message set that includes the dialed number to SSCP 415 of IN platform 430. SSCP 415 then queries HLR 330 in order to determine the current location of the mobile station being called. (HLR 330 for the UPCS areas can be the same as HLR 160 used for cellular communication.)

In step 1372, HLR 330 determines whether the dual mode mobile station is registered at a UPCS location. If HLR 330 is not registered at a UPCS location, then control is passed to step 1387 (FIG. 13C). In that step, HLR 330 sends the stored cellular number for the dual mode mobile station to the IN platform 430. Subsequently, in step 1390 IN platform 430 determines whether the number received from the HLR 330 is a cellular number. (This information is important because the rate for completing a call in a cellular mode may be different from the rate for completing a call in a UPCS mode.)

If in step 1372 (FIG. 13A) it is determined that the dual mode mobile station is registered to a UPCS location, then in step 1375 HLR 330 sends a message set to mobility switch 325 requesting a temporary routing number and subsequently waits for a response from mobility switch 325. In step 1377, HLR 330 sends the temporary routing number (received from mobility switch 325) to IN platform 430. In step 1380, IN platform 430 rates the call (i.e., determines the payment required) and determines whether the dual mode mobile station has a sufficient debit account balance (i.e., debit account balance section 640, shown in FIG. 6, is checked) to place the call. If there are sufficient finds or credits, then the call is placed according to steps 1345–1362, as described above. If there are insufficient funds or credits, then the call is terminated in step 1383. (Optionally, the originating caller is informed of why the call is terminated in step 1383.)

Figure 14:
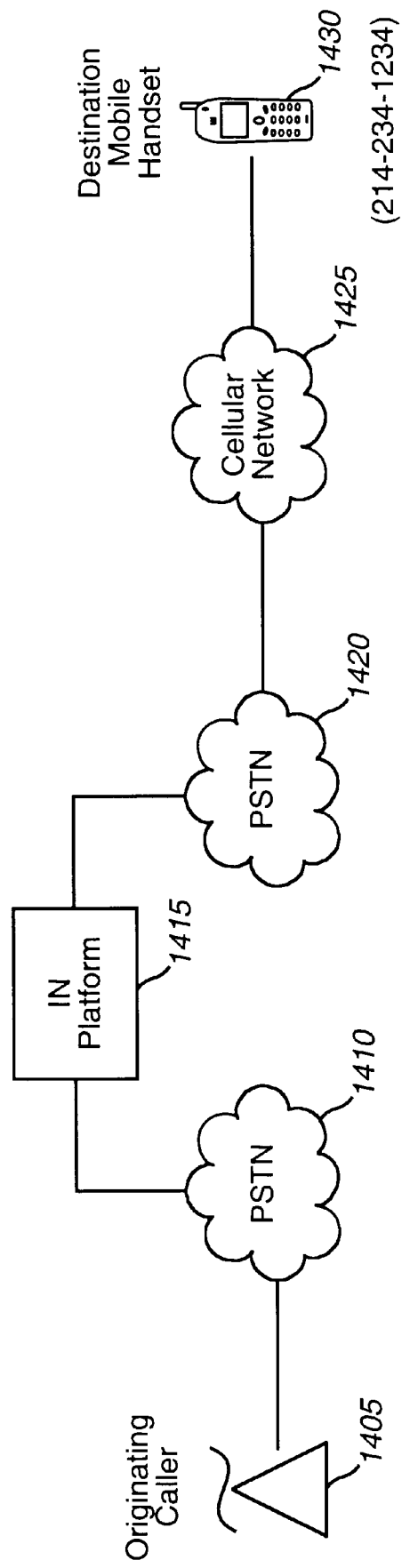
FIG. 14 illustrates an inbound call to a dual mode mobile station functioning in a cellular mode.

III. System and Method for Cellular Reseller Control of Inbound Calls to a Mobile Station FIG. 14 illustrates call termination to a cellular telephone. Specifically, FIG. 14 illustrates an inbound call to a dual mode mobile station. FIG. 14 comprises originating caller 1405, PSTN 1410, IN platform 1415, PSTN 1420, cellular network 1425, and dual mode mobile station 1430. Resell platform 1415 comprises intelligent network communications equipment that provides a telecommunications services provider the ability to determine the ultimate routing of a call or to provide each call with special features, such as an AIN (advanced intelligent network), and in particular an IN (intelligent network) platform, though equivalents thereof may be used as known to those of ordinary skill.

In order for the dual mode station to perform in both a cellular mode and a UPCS mode, a single service provider will likely attempt to provide both types of services. Therefore, in the instant embodiment, the single service provider will resell cellular services to either the entity paying for a private dialing plan service (e.g., the user's company) or to a dual mode mobile station user paying for a debit call. A reseller is a company that purchases a group of cellular numbers from a cellular service provider for resale to its customers.

Accordingly, dual mode mobile station 1430 has an associated PSTN number 214-234-1234 (unknown to the dual mode mobile station user), which the reseller has purchased from the cellular service provider. Any time a caller dials the number 214-234-1234, the call is routed through the PSTN to the network of the cellular service provider, which subsequently rings dual mode mobile station 1430. For the instant embodiment, the cellular network may resemble the cellular network of FIG. 1, though those of ordinary skill will easily recognize that the instant embodiment is applicable to any cellular network.

Initially, the inbound call is routed through the network of the cellular services providers, LEC service providers, and IEC service providers, as required. The dual mode mobile station is located as provided in the above explanation with respect to FIG. 1.

After the called dual mode mobile station 1430 goes off-hook (i.e., dual mode mobile station 1430 is answered by the dual mode mobile station user), a traffic channel is established between the originating caller and the called dual mode mobile station. In addition, the centralized switching centers (e.g., MSCs) create call records using the true destination cellular telephone number of the called dual mode mobile station 1430, namely, 214-234-1234, for the purpose of billing the customer.

In the instant embodiment, the reseller of cellular service is billed for any cellular phone calls placed to dual mode mobile station 1430. The reseller has purchased the destination telephone number 214-234-1234 from a cellular services provider and sells use of the dual mode mobile station 1430 to a secondary customer. If the inbound call is a valid private dialing plan call, then the reseller must bill the customer (e.g., the user's company) in arrears. On the other hand, if the inbound call is a valid debit call to the dual mode mobile station user, namely, a call for which the dual mode mobile station user has authorized payment, then the reseller must debit the dual mode mobile station user's account for the call.

There are two potential problems that may arise, causing the reseller of cellular service to be billed for a phone call that the reseller is not in a position to bill to any customer. A first problem is created in the situation wherein originating caller 1405 is aware of the cellular telephone number 214-234-1234 associated with the dual mode mobile station 1430. If the originating caller 1405 is aware of this number, the originating caller can simply dial the number, which is transmitted via the PSTN (e.g., PSTN 1410 and PSTN 1420) to the cellular network 1425 for transmission to dual mode mobile station 1430. In this situation, the reseller of cellular service is completely bypassed, such that the reseller is not capable of determining the outcome of the call or of billing the call to any customer. Hence, the reseller of cellular service will be billed by the cellular service provider for a call over which the reseller has no control. The reseller is unable to pass on any payment to a secondary customer, namely the purchaser of the private dialing plan or the dual mode mobile station user himself. Accordingly, it is important to maintain the cellular telephone number, e.g., the cellular telephone number 214-234-12334, unrevealed to the originating caller 1405.

A second problem associated with the first problem occurs when the dual mode mobile station user 1430 learns of the true destination number 214-234-1234 through happenstance. For example, suppose an originating caller dials 214-234-1234 by accident. When the user of dual mode mobile station 1430 receives such a call, and becomes aware that an originating caller was capable of calling him by dialing the number 214-234-1234 that was previously unknown to him, then the user of dual mode mobile station 1430 is made aware that he can receive a free telephone call if an originating caller dials the number 214-234-1234.

In order to solve these problems, the reseller of cellular service must (1) hide the true destination number 214-234-1234 from the destination dual mode mobile station 1430 user, and (2) provide a form of intervention between the originating caller and the destination dual mode mobile station for an inbound cellular call. As discussed further below, the reseller will provide (1) an IN platform 1415 between the originating caller 1405 and the destination dual mode mobile station 1430, (2) a connection and corresponding dialogue between the IN platform 1415, and both the cellular network 1425 and the destination dual mode mobile station 1430.

Figure 15:
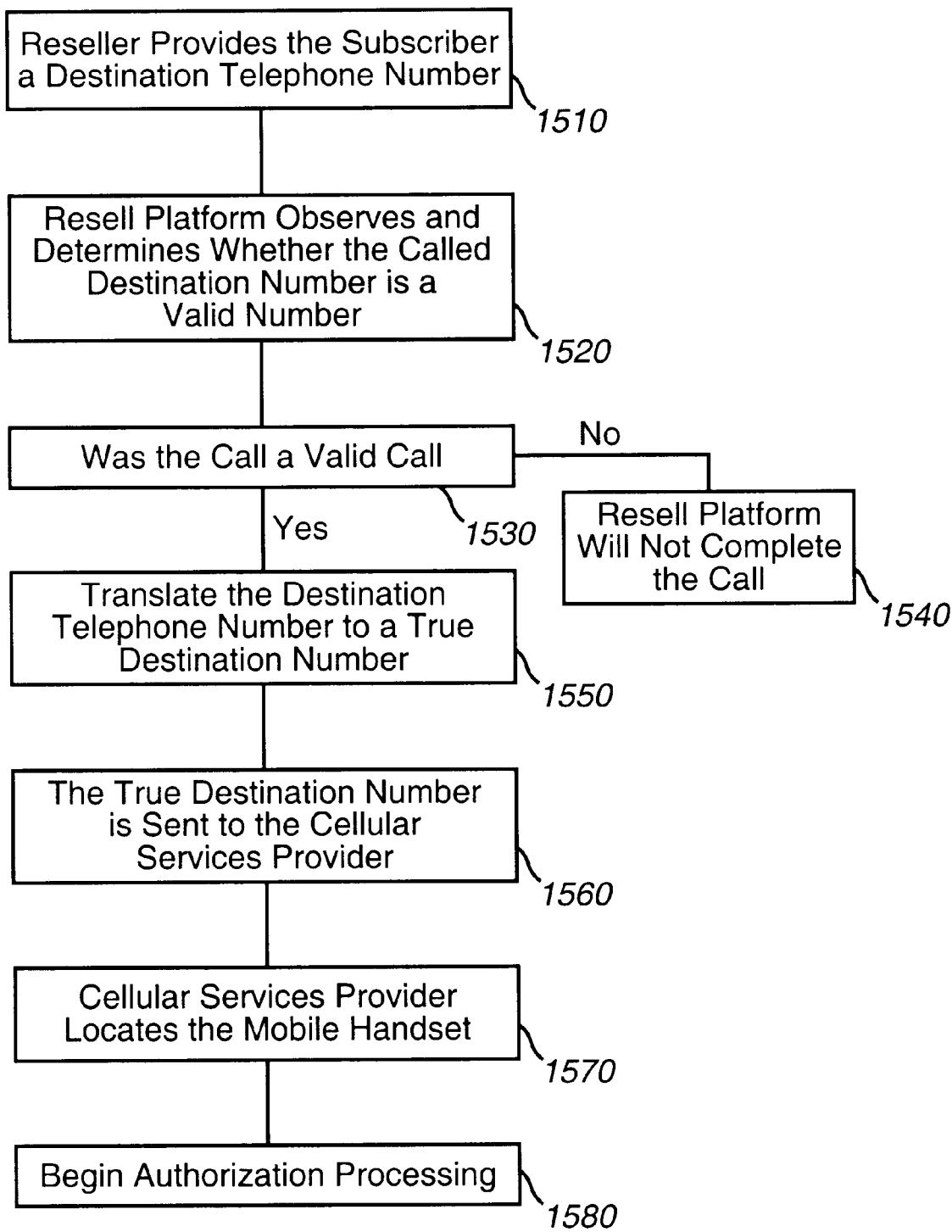
FIG. 15 is a flow chart demonstrating the establishment of a connection between the originating caller and the destination dual mode mobile station for a dual mode mobile station receiving an inbound call in a cellular mode.

FIG. 15 is a flow chart demonstrating the establishment of a connection between the originating caller and the destination dual mode mobile station for an inbound call. Specifically, in accordance with a preferred embodiment of the invention, FIG. 15 illustrates the qualification of the originating caller 1405 by the IN platform 1415, and the location of the destination dual mode mobile station 1430.

In step 1510, the reseller assigns a destination telephone number to dual mode mobile station 1430, which is different than the true destination number purchased from the cellular services provider. The dual mode mobile station destination telephone number may be a standard PSTN number. However, the reseller may also provide the subscriber special access numbers, such as an "800" number, a "500" number, or equivalents thereof. For a special access number, the caller initially dials the special access code, and is subsequently prompted for an additional number (i.e., provided by the reseller) in order to obtain access to the network elements that complete the call. In addition, for a special access number, the number itself (i.e., the "800" number) may also be associated with a specific destination dual mode mobile station, wherein a second number need not be dialed by the user. The called number, whether a special access number or a PSTN number, will be routed to the IN platform 1415.

In step 1520, the IN platform 1415 observes the incoming digits received from PSTN 1410 and determines whether the call is a valid call. Specifically, the IN platform 1415 looks up the special access number or the PSTN number in a database in order to validate the call. As recognized by those of ordinary skill, an IN platform 430 database or equivalent may be used for validation.

In step 1530, flow control is determined from the determination of whether the call is valid from step 1520. In step 1530, if it was determined in step 1520 that the call is not a valid call to a dual mode mobile station recognized by IN platform 1415, then in step 1540 IN platform 1415 will not complete the call. In one embodiment, IN platform 1415 transmits a message to inform the originating caller 1405 that the call is not a valid call.

In step 1530, if it was determined in step 1520 that the call is a valid call to a dual mode mobile station recognized by IN platform 1415, then the flowchart is resumed in step 1550.

In step 1550, IN platform 1415 translates the received digits to the true destination number of the called dual mode mobile station 1430 (e.g., 214-234-1234). At this point, the call rating may be started by the reseller in order to determine how much to charge the customer (the called dual mode mobile station) for the call. As with the above embodiment describing billing with respect to an inbound PCS call, the IN platform can determine whether the call is a private dialing plan call depending upon whether a private dialing plan special access code has been dialed, or whether the call has been routed over a DAL pre-designated for a private dialing plan customer. In the event the call is not a private dialing plan call, the IN platform 1415 must debit the called dual mode mobile station for the call in advance of the call.

In step 1560, IN platform 1415 transmits the true destination number to PSTN 1420. PSTN 1420, in turn, transmits the true destination number to cellular network 1425.

In step 1570, the cellular services provider locates the dual mode mobile station using the true destination number. This step is performed as discussed above with relation to FIG. 1. Once the called dual mode mobile station is located, billing is handled similarly as described with relation to an inbound PCS call. Specifically, the called dual mode mobile station is billed in arrears if the call is a private dialing plan call. On the other hand, if the call is not restricted, then the debit account balance associated with the called dual mode mobile station is checked to determine whether there are sufficient funds available in the called dual mode mobile station to allow the call.

In step 1580, authorization processing of the destination dual mode mobile station commences. Specifically, data communication between IN platform 1415 and the dual mode mobile station 1430 will determine whether the inbound call to the dual mode mobile station is a valid call.

Figure 16:
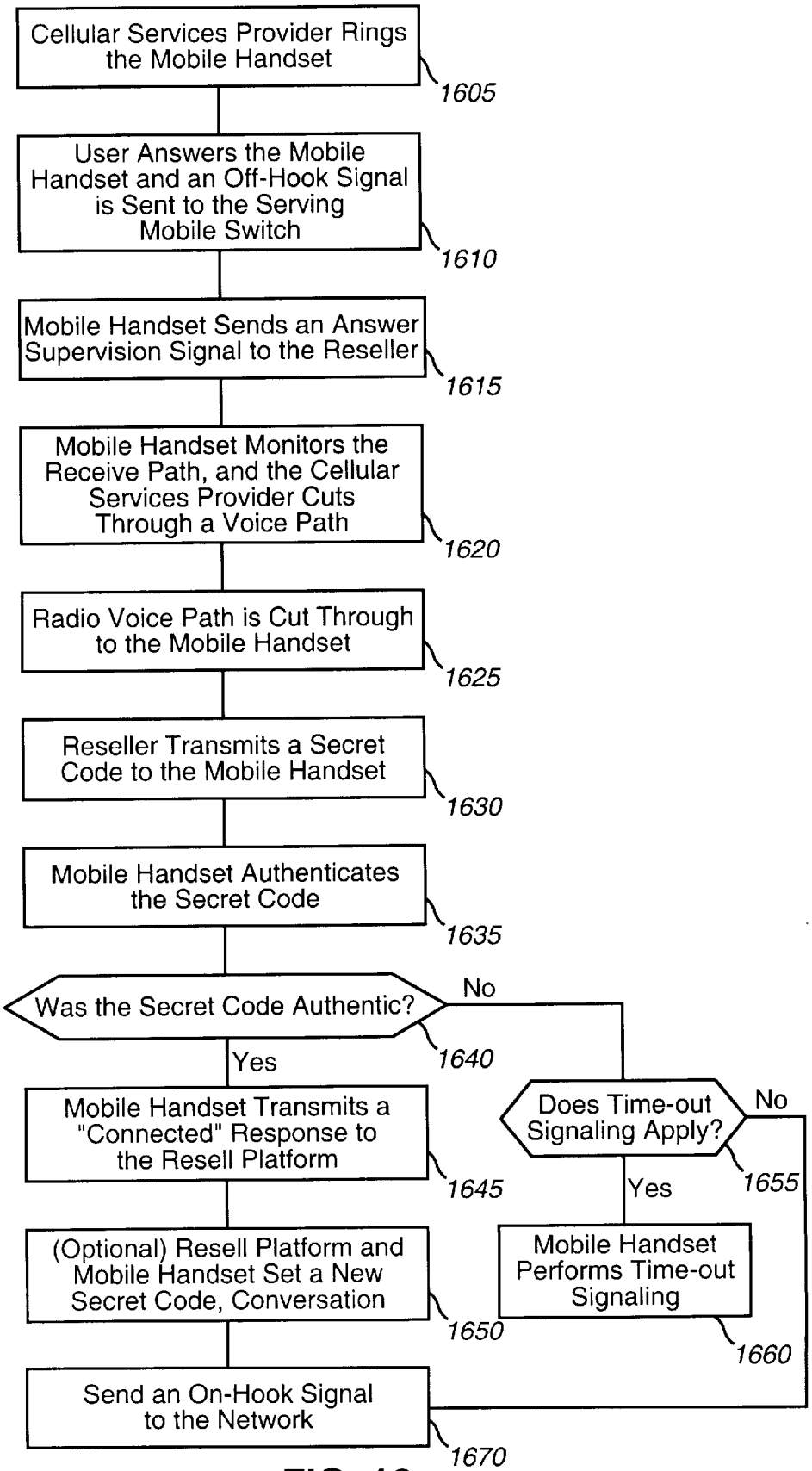
FIG. 16 is a flow chart for a method for determining whether an inbound cellular call transmitted from an IN platform to a located dual mode mobile station is a valid call.

FIG. 16 is a flow chart for a first method for determining whether the call transmitted from the IN platform to the located dual mode mobile station is a valid call.

In step 1605, the cellular service provider 1415 transmits signaling information over the radio path instructing the dual mode mobile station 1430 to ring. After receiving the signaling information, the dual mode mobile station 1430 rings, or in some other way alerts the dual mode mobile station user that a call is coming through.

In step 1610, the user responds to the ringing by answering the dual mode mobile station. As mentioned, this response is referred to as the receiving party "going off-hook."

In step 1615, in response to the destination caller going off-hook, the cellular services provider transmits an answer supervision signal to the preceding switch train to the IN platform 1415. In the sample cellular communications network of FIG. 1, the MSC of the location area wherein the called dual mode mobile station is located will transmit the answer supervision signal to the IN platform 1415. Those of ordinary skill will recognize that a component having equivalent functions in the cellular system may transmit the answer supervision signal as well. Answer supervision refers to signaling data transmitted from the central office (i.e., a centralized switch) of the destination caller to the central office of the originating caller to inform the originating caller central office to begin billing the call. In the instant embodiment, the MSC of the destination dual mode mobile station 1430 and the IN platform 1415 fulfill the functions of central office switch, though those of ordinary skill will recognize that any equivalent switches will provide similar functionality. Answer supervision actually begins when the destination caller (e.g., the user of dual mode mobile station 1430) goes off-hook.

In step 1620, the destination dual mode mobile station 1430 monitors the receive path for a secret code transmitted from the IN platform 1415. The secret code is a sequence of digits pre-stored by both the dual mode mobile station 1430 and the IN platform 1415 for the purpose of validating the call. Here, the dual mode mobile station monitors pre-designated frequencies for receipt of the secret code stored by the IN platform 1415. As provided below, the dual mode mobile station 1430 must determine whether the secret code transmitted from the IN platform 1415 matches the secret code stored in its own internal memory.

In step 1625, the cellular services provider "cuts through" a voice path in two directions: (1) from the IN platform 1415 to the dual mode mobile station 1430, and (2) from the dual mode mobile station 1430 to the IN platform 1415. "Cutting through" a voice path refers to the process of assigning appropriate traffic frequencies for establishment of a voice communication. The radio voice cut through signal is transmitted at the time the answer supervision signal is sent. After the voice path cut through, an open voice channel is provided between the IN platform 1415 and the destination caller 1430. Step 1620 of monitoring of the radio path for a secret code and step 1625 of cutting through bidirectional a voice path from the IN platform 1415 can be performed in sequence or in parallel.

In step 1630, IN platform 1415 sends the secret code to the destination dual mode mobile station 1430. It is important to note that receipt of the radio voice path cut through signal and receipt of the secret code by the dual mode mobile station 1430 must occur in order, and are necessarily sequential in order. Accordingly it is possible that the secret code is transmitted over an in-band signaling channel, wherein the voice channel is used for both signaling data and voice communications, or an out-of-band signaling channel, wherein a separate channel is used for signaling as for voice communication. However, if in-band signaling is used, such that signaling information is to be transmitted over the voice channel, then it is necessary that the voice path cut through be provided before the secret code is transmitted, so that the secret code can be transmitted over the created voice path. In any case, the instant invention permits one of ordinary skill in the art to use either a voice channel or a signaling channel for transmission of the secret code, or of any other equivalent information transmitted between network elements.

In step 1635, the dual mode mobile station 1430 receives the secret code and authenticates the secret code. During authentication, the dual mode mobile station 1430 analyzes the code to determine whether a correct code has been transmitted from the IN platform 1415. The dual mode mobile station may use any recognized method to authenticate the dual mode mobile station. As one example, the dual mode mobile station authenticates the secret code by running an algorithm using the secret code as an input variable. As another example, the dual mode mobile station compare the secret code to a value stored in an internal memory (e.g., a database) or an external memory (e.g., an intelligent card). As recognized by those of ordinary skill, any number of art-recognized equivalents may be used to authenticate the secret code.

In step 1640, if it is determined that the secret code is an authentic code, then control is passed to step 1645. Otherwise, if in step 1640 it is determined that the secret code is not an authentic code, then control is passed to step 1655.

In step 1645, the dual mode mobile station 1430 transmits a connected response signal to the IN platform. This signal informs the IN platform that a proper connection has been established between the originating caller 1405 and the destination dual mode mobile station 1430. In addition, in step 1645 the speaker of dual mode mobile station 1430 is actuated (i.e., turned "ON"), so that dual mode mobile station 1430 will accept and transmit voice communications from a user speaking into the dual mode mobile station. Accordingly, at step 1645 there is an end-to-end cut through voice path, wherein complete voice communications is established between the originating caller 1405 and the destination dual mode mobile station 1430.

In one embodiment, the IN platform 1415 waits to create the end-to-end cut through path of step 1645 until after it receives a confirmation that the dual mode mobile station 1430 received the secret code and the secret code is determined to be authentic. In this embodiment, time-out signaling is used, wherein IN platform 1415 waits for a response to the secret code it has transmitted to the dual mode mobile station 1430. If a response is not received within a pre-determined time period, another secret code message is sent to dual mode mobile station 1430. A pre-determined number of signals followed by a time-out are allowed before IN platform 1415 determines the connection is not valid. Should this latter determination be made, IN platform 1415 will terminate the connection and may transmit a corresponding alarm signal to originating caller 1405.

In another embodiment, IN platform 1415 waits to create the voice path cut through in two directions of step 1625 until after it receives a confirmation that the dual mode mobile station 1430 received the secret code and the secret code is determined to be authentic. Here, time-out signaling may be provided similarly as discussed above.

Step 1650 is an optional step. In this step, both the IN platform 1415 and the destination dual mode mobile station 1430 set a new secret code, for future calls. Specifically, both the IN platform 1415 and the destination dual mode mobile station 1430 will use the previous secret code to create a new secret code, one that will be the same for the IN platform 1415 and the dual mode mobile station 1430. As recognized by those of ordinary skill, a new secret code may be established in a variety of ways. For example, both the IN platform and the dual mode mobile station may apply a pre-designated algorithm using the old secret code an input, in order to derive a new secret as output. The next time an inbound call is received by dual mode mobile station 1430, the IN platform 1415 will send the new secret code and the dual mode mobile station 1430 will look for the new secret code. In this manner, the secret code can be set dynamically.

If in step 1640 it is determined that the secret code is not an authentic code, then control is passed to step 1655. In step 1655, it is determined whether time-out signaling is to be applied during authentication. If time-out signaling is applied during authentication, then control is passed to step 1660. Otherwise, if time-out signaling is not applied during authentication, then control is passed to step 1670.

If time-out signaling is provided during authentication, then in step 1660 dual mode mobile station 1430 transmits a failed response to the IN platform 1415 because it determines that it received an invalid secret code or did not receive any secret code. Dual mode mobile station 1430 waits for another secret code to be transmitted from the IN platform 1415. If a response is not received within a pre-determined time period, it will send a message to IN platform 1415 indicating it has not received a valid secret code. After dual mode mobile station 1430 transmits such messages and times-out a pre-determined number of times, control is passed to step 1670.

In step 1670 the connection is terminated. If control is passed to step 1670 from steps 1655 or 1660, it is determined that the connection has failed. Dual mode mobile station 1430 transmits an on-hook signal to the IN platform, which terminates the connection. An alarm signal informing destination caller 1405 of what has occurred may optionally be provided. On the other hand, if control is passed to step 1670 from step 1650, then the connection has been completed and the calling parties have completed their conversation. In this latter case, dual mode mobile station 1430 transmits an on-hook signal to the IN platform to terminate the connection, but no alarm signal need be generated.

There is a second approach to ensuring that the reseller is not bypassed by the caller originating the call, and that the reseller may properly pass on its charges to a customer. This second approach uses a service provided by cellular services providers known as SCA (selective call acceptance).

Referring to FIG. 15, steps 1510–1540 are performed exactly the same as described above. However, in step 1550 identification information associated with the originating caller 1405 (e.g., calling party number) is translated by the IN platform 1415 into a platform identification number provided by the reseller to the cellular service provider.

The IN platform 1415 transmits the platform identification number as the calling party number and the true destination number to the PSTN 1420, which routes the information to the cellular network 1425. Alternatively, this information may be routed directly to an MSC in the cellular network 1425, without first routing the information to the PSTN 1420.

The MSC receiving this identification information, called the home MSC, invokes SCA or a similar service, wherein the platform identification information is compared to an SCA database to determine whether the call is to be completed or blocked. If a match for the platform identification number is found, then the cellular services provider extends the call as described with respect to FIG. 1, including the on-hook, off-hook, answer supervision signals described with respect to FIG. 16. However, because the cellular services provider uses the SCA to authorize the call, there is no need for the called dual mode mobile station 1430 and the IN platform 1415 to exchange a secret code as described therein.

If a match for the platform identification number is not found in the SCA database, then the cellular services provider blocks the call. If the call is blocked, an alarm indication may be transmitted back to the handset of the originating caller 1405.

Figure 17:
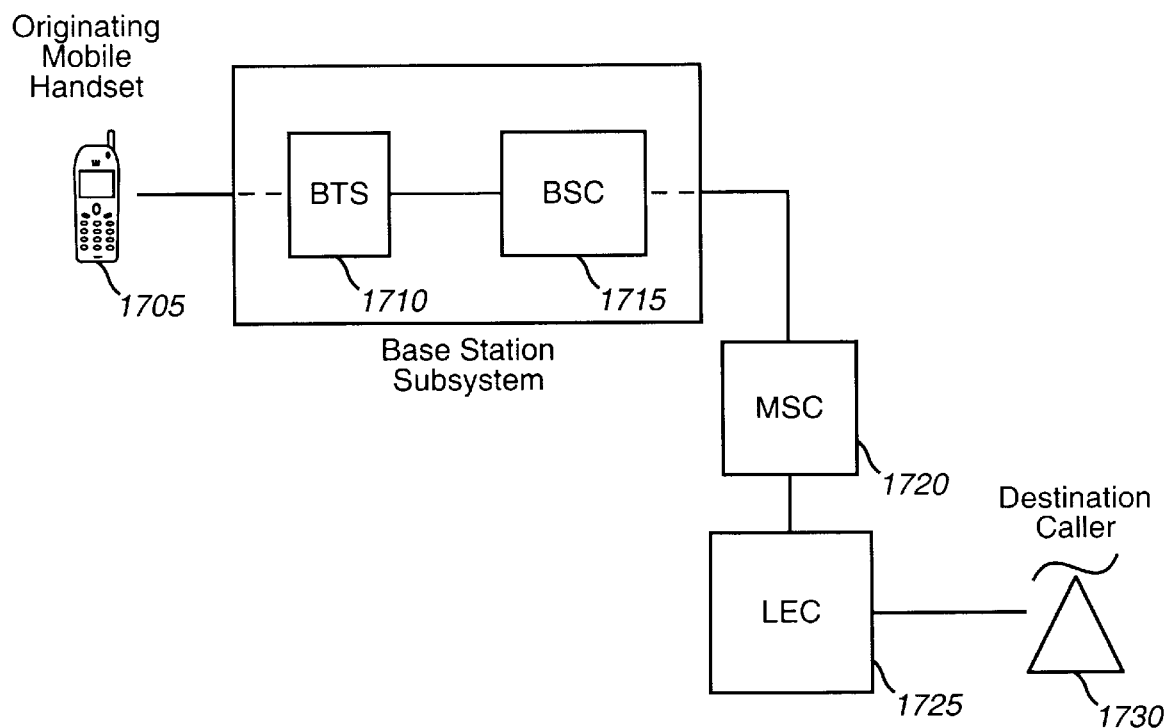
FIG. 17 illustrates an outbound call from a dual mode mobile station functioning in a cellular mode.

IV. System and Method for Cellular Reseller Control of Outbound Calls from a Mobile Station FIG. 17 illustrates a call originating from a dual mode mobile station transmitted to a destination caller in an ordinary cellular network, i.e., a network with no reseller of cellular services. Because the call originates from a dual mode mobile station, it is referred to as an outbound call from an originating dual mode mobile station. FIG. 17 comprises originating dual mode mobile station 1705, BTS 1710, BSC 1715, MSC 1720, LEC 1725, and destination caller 1730. BTS 1710 and BSC 1715 comprise a base station subsystem (BSS) for the cell wherein originating dual mode mobile station 1705 is located. The base station subsystem comprises BTS 1710 and BSC 1715. One or more base station subsystems comprise a location area, with each location area being serviced by a single MSC 1720.

Initially, the call is transmitted from originating dual mode mobile station 1705 to the base station subsystem servicing originating dual mode mobile station 1705. The request for making an outgoing call is transmitted to MSC 1720. MSC 1720 routes the call to an appropriate telecommunications facility depending upon the location of the destination caller with respect to the originating dual mode mobile station 1705, and the telecommunications services providers chosen by the originating and destination callers. If the destination caller were a cellular telephone, then the call would be routed to the destination caller in a manner similar to the above explanation with respect to FIG. 1. For simplification, the instant embodiment of FIG. 17 illustrates the call being routed from MSC 1720 to a LEC 1725, which completes the call to destination caller 1730. In addition, the call may also be routed to an IEC switch for routing through an IEC network for long distance calls.

Figure 18:
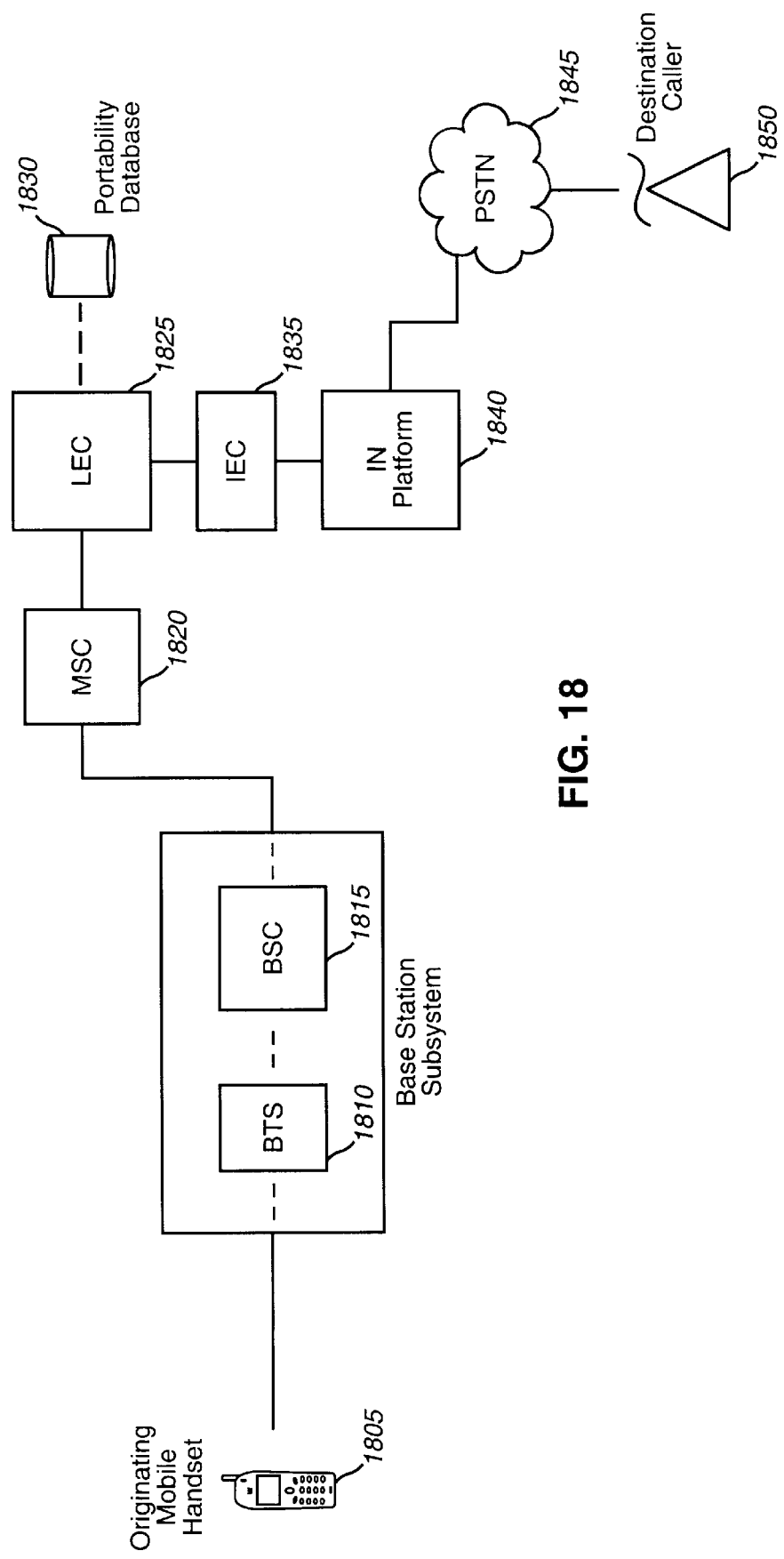
FIG. 18 illustrates an outbound call from a dual mode mobile station functioning in a cellular mode.

FIG. 18 illustrates an outbound call from a cellular telephone with reseller facilities. FIG. 18 comprises originating dual mode mobile station 1805, BTS 1810, BSC 1815, MSC 1820, LEC 1825, portability database 1830, IEC 1835, IN platform 1840, PSTN 1845, and destination caller 1850.

Resell platform 1840 comprises intelligent network communications equipment that provides a telecommunications services provider the ability to determine the ultimate routing of a call or to provide each call with special features, such as an AIN (advanced intelligent network), and in particular an IN (intelligent network) platform (i.e., as described above in connection with FIGS. 4, 11), though equivalents thereof may be used as known to those of ordinary skill.

In order for the dual mode mobile station to perform in both a cellular mode and a UPCS mode, a single service provider will likely attempt to provide both types of services. Therefore, in the instant embodiment, the single service provider will resell cellular services to either the entity paying for a private dialing plan service (e.g., a user's company) or to a dual mode mobile station user (e.g., a user himself) paying for a debit call.

In the instant embodiment, the reseller of cellular service who provides dual mode mobile stations to a secondary customer is billed for any outbound cellular phone calls placed from dual mode mobile station 1805. If the outbound call is a valid private dialing plan call, one that will be billed to the purchaser of the private dialing plan (i.e., the user's carrier company), then the reseller must bill the call to the purchaser in arrears. On the other hand, if the outbound call is a valid debit call to the dual mode mobile station user, namely, a call for which the dual mode mobile station user has authorized payment, then the reseller must debit the dual mode mobile station user's account for the call.

A problem arises if the user of the originating dual mode mobile station 1805 is permitted to make an outbound call in a normal manner by simply dialing the destination telephone number of destination caller 1850. In this event, the cellular services provider will bill the reseller of cellular services who has purchased cellular telephone numbers from the cellular services provider. However, since the reseller is bypassed in the routing and billing of the call, the reseller is not capable of determining the outcome of the call or of billing the call to any customer. Hence, the reseller will be billed by the cellular service provider for a call over which the reseller has no control and for which the reseller is unable to pass on the payment to a secondary customer.

In order to solve this problem, the reseller of cellular service must provide a form of intervention between the originating dual mode mobile station 1805 and the destination caller 1850. For this function, the reseller will provide: (1) an IN platform 1840 between the originating dual mode mobile station 1805 and the destination caller 1850, and (2) a connection and corresponding dialogue between the IN platform 1840 and the originating dual mode mobile station 1805.

Figure 19:
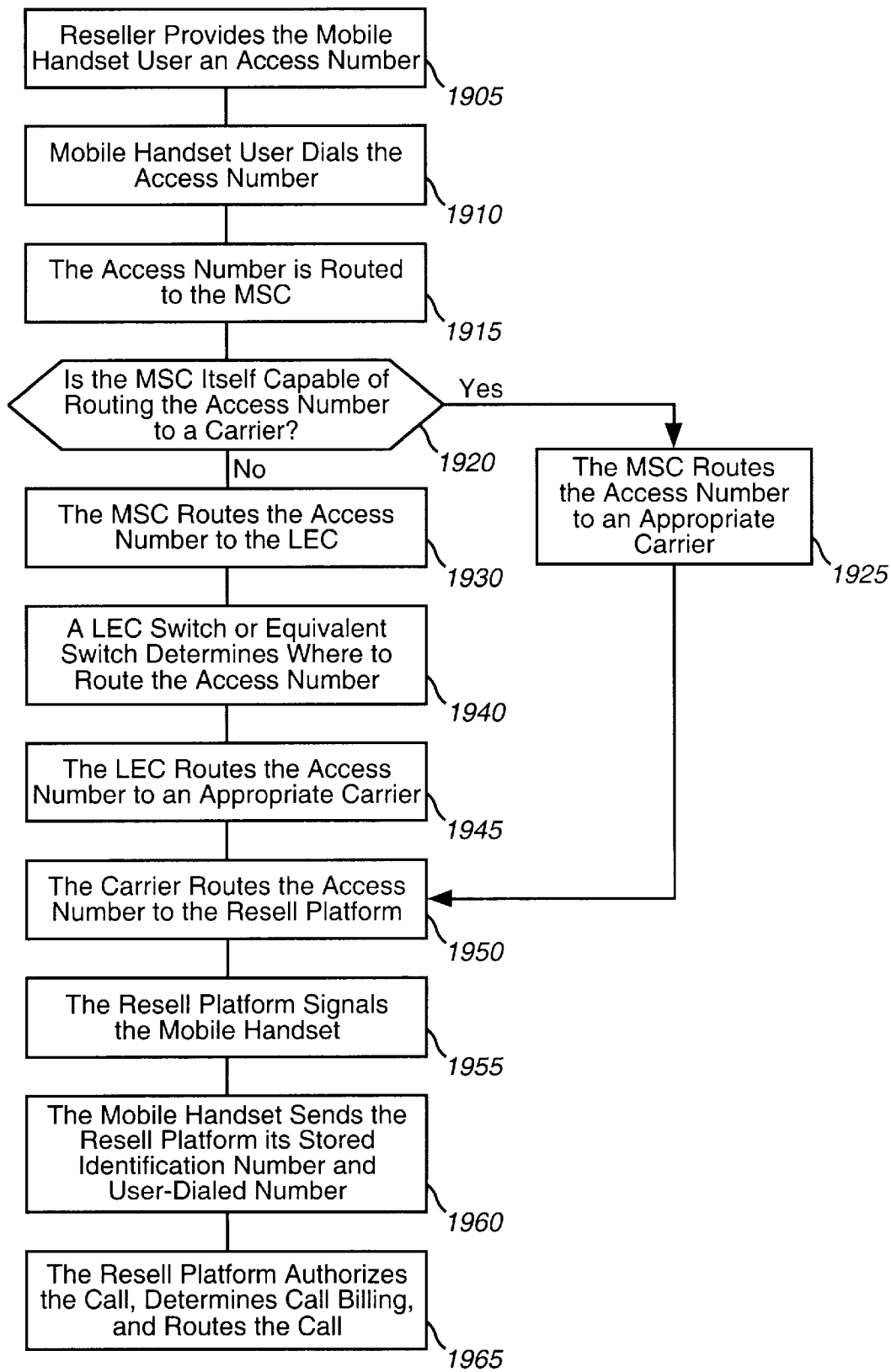
FIG. 19 is a flowchart demonstrating the establishment of a connection between an originating dual mode mobile station transmitting an outbound call and a destination caller.

FIG. 19 is a flowchart demonstrating the establishment of a connection between the originating dual mode mobile station and the destination caller, in connection with the present invention. Specifically, FIG. 19 illustrates a connection between originating dual mode mobile station 1805 and destination caller 1850.

In step 1905, the reseller provides the user of the originating dual mode mobile station 1805 an access number for use when making an outbound cellular call. For example, the reseller may provide the subscriber a special access number, such as an "800" number, a "500" number, or equivalents thereof. The access number is the only manner by which the user is permitted to make an outbound cellular phone call except for special emergency numbers, such as "911" calls. Emergency numbers are routed directly to the destination caller using the standard telecommunications network.

It should be noted that the access number can be transparent to and not accessible by the user, i.e., the dual mode mobile station automatically dials the access number first for all calls originating therefrom, except for emergency calls which are handled as noted above. For additional fraud protection, the cellular services provider can be asked to block all calls except for the specified access number and emergency numbers.

In step 1910, the user of the originating dual mode mobile station 1805 dials the access number provided by the reseller, or the access number is dialed automatically by the mobile station itself, as noted.

In step 1915, the access number dialed by a user using originating dual mode mobile station 1805 is routed to the MSC of the cellular services provider. Specifically, the number dialed by the user of originating dual mode mobile station 1805 is transmitted to a base station subsystem comprising BTS 1810 and BSC 1815, and then transmitted therefrom to MSC 1820 of the cellular services provider.

In step 1920, it must be determined whether MSC 1820 is itself capable of routing the access number to the appropriate carrier. If it is determined that the MSC is indeed capable of routing the access number to the appropriate carrier, then control is passed to step 1925. In step 1925, MSC 1820 routes the access number to an appropriate carrier (e.g., a LEC switch or an IEC switch) using a translation table associated therewith. From step 1925, control is immediately passed to step 1950, as described below.

If, in step 1920, it is determined that the MSC 1820 itself is not capable of routing the access number to an appropriate carrier, then control is passed to step 1930. In step 1930, MSC 1820 transmits the access number to a LEC facility, and in particular, to LEC switch 1825. Though in the instant embodiment MSC 1820 transmits the access number to a LEC facility, it is also possible for MSC 1820 to transmit the access number to an IEC facility. In addition, it is also possible for MSC 1820 to an IEC facility providing LEC services.

In step 1940, the LEC switch receiving the access number uses an internal or an external database to determine where to route the access number. As noted above, an equivalent IEC facility may receive the call as well. In particular, LEC switch 1825 uses portability database 1830 to determine whether to route the access number. The portability database 1830 may be located peripheral to LEC switch 1825.

In step 1945, the LEC routes the access number to an appropriate carrier associated therewith as determined by the look-up in the portability database 1830. In the instant example, LEC switch 1825 routes the access number to IEC switch 1835.

In the instant embodiment, IEC switch 1835 is an initial access facility used by the reseller in its carrier network. In step 1950, the carrier routes the access number to the IN platform. In the instant example, IEC switch 1835 transmits the access number directly to IN platform 1840. On the other hand, the reseller may use a plurality of switches to transmit the access number to its IN platform 1840. In addition, the IN platform 1840 may validate the access number received by searching a validation database for a match to the access number received.

In step 1955, the IN platform transmits a signal to the originating dual mode mobile station indicating that it has received a valid access number. At this point, the IN platform 1840 begins monitoring a radio receive path for a return signal from the originating dual mode mobile station. Hence, the IN platform 1840 monitors the incoming circuit for receipt of a signal from originating dual mode mobile station 1805.

The signal transmitted from IN platform 1842, originating dual mode mobile station 1805 may be in-band signaling information or out-of-band signaling information, including DTMF tones. If, in step 1955, the IN platform 1840 transmits signaling information to originating dual mode mobile station 1805 in-band (i.e., over a voice path), then it is necessary that a voice path "cut through" had been previously transmitted from IN platform 1840 to originating MSC 1820. However, if signaling information transmitted from IN platform 1840 to originating dual mode mobile station 1805 and from originating dual mode mobile station 1805 to IN platform 1840 is transmitted out-of-band, i.e., not over a voice path, then a voice path cut through is not required at this point.

In step 1960, the originating dual mode mobile station sends the IN platform its stored mobile identification information and the user-dialed number. The user-dialed number is the number of the destination caller actually dialed by the user using originating dual mode mobile station 1805. This user-dialed number had been stored by originating dual mode mobile station 1805 when the user attempted to place the call.

In step 1965, the IN platform authorizes the caller, determines the type of call billing, and routes the call to the destination caller 1850 through PSTN 1845. Since the user placing an outbound call from originating dual mode mobile station 1805 is permitted to have a private dialing plan method of payment or a debit account method of payment, call authorization, call billing and call routing are handled in a similar manner to that performed for an outbound UPCS call. In other words, the call is authorized, billed, and routed as described above with respect to FIGS. 5–8.

While the invention has been particularly shown and described with reference to preferred embodiments thereof, it will be understood by those skilled in the relevant art that various changes in form and details may be made therein without departing from the spirit and scope of the invention.

What is claimed is:

1. A method for controlling an outbound call transmitted from a mobile station in a cellular frequency band, wherein use of a cellular telephone number is purchased from a cellular services provider by a reseller and maintained confidential from a user of the station, comprising:

(a) providing the user of the station with an access number for dialing out from the station, which is different from the cellular telephone number, and permitting the user access to the access number for an outbound call from the station, where the access number forms a part of a message set for transmission to a cellular services facility for accessing an IN (intelligent network) platform if said user dials a destination number, wherein said message set includes area site information;

(b) obtaining access to said IN platform for validation of the outbound call, wherein step (b) further comprises:

(1) transmitting said access number to a switching facility having access to a carrier capable of transmitting said access number to said IN platform;

(2) transmitting said access number to a switching facility of said carrier, said facility transmitting said access number to said IN platform for validation;

(3) transmitting a signal to the station indicating a valid access number has been received;

(c) rating the outbound call and allowing the user to transmit a request for and receive call credits as needed to complete the call; and (d) completing the outbound call between the user and a called party.

2. A system for controlling a call transmitted from a mobile station in a cellular frequency band, wherein use of a cellular telephone number is purchased from a cellular services provider by a reseller and maintained confidential from a user of the station, comprising:

means for providing the user of the station with an access number for dialing out from the station, which is different from the cellular telephone number, and permitting the user access to the access number for an outbound call from the station, where the access number forms a part of a message set for transmission to a cellular services facility for accessing an IN (intelligent network) platform if said user dials a destination number, wherein said message set includes area site information;

means for obtaining access to said IN platform for validation of the outbound call, wherein the means for obtaining access to said IN platform further comprises:

means for transmitting said access number to a switching facility having access to a carrier capable of transmitting said access number to said IN platform;

means for transmitting said access number to a switching facility of said carrier, said facility transmitting said access number to said IN platform for validation;

means for transmitting a signal to the station indicating a valid access number has been received;

means for rating the outbound call and allowing the user to transmit a request for and receive call credits as needed to complete the call; and completing the outbound call between the user and a called party.

3. A method according to claim 2, further comprising:

billing the outbound call to a private dialing plan customer in arrears if it is determined that the outbound call is a private dialing plan call.

4. A method according to claim 2, wherein if it is determined that the outbound call is a debit call, then the method further comprising:

permitting completion of the outbound call if it is determined that there are sufficient funds registered to the station to complete the outbound call for a predetermined period of time, wherein said call credits are consumed during the outbound debit call, during a subsequent outbound debit call, and during a subsequent inbound debit call.

5. A method according to claim 2, further comprising:

preventing completion of the outbound call if it is determined that the outbound call is a restricted call.

6. A system for controlling a call transmitted from a mobile station in a cellular frequency band, wherein use of a cellular telephone number is purchased from a cellular services provider by a reseller and maintained confidential from a user of the station, comprising:

means for providing the user of the station with an access number for dialing out from the station, which is different from the cellular telephone number, and permitting the user access to the access number for an outbound call from the station, where the access number forms a part of a message set for transmission to a cellular services facility for accessing an IN (intelligent network) platform if said user dials a destination number, wherein said message set includes area site information;

means for obtaining access to said IN platform for validation of the outbound call, wherein the means for obtaining access to said IN platform further comprises:

means for transmitting said access number to a switching facility having access to a carrier capable of transmitting said access number to said IN platform;

means for transmitting said access number to a switching facility of said carrier, said facility transmitting said access number to said IN platform for validation;

means for transmitting a signal to the station indicating a valid access number has been received;

means for rating the outbound call and allowing the user to transmit a request for and receive call credits as needed to complete the call; and completing the outbound call between the user and a called party.

7. A system according to claim 6, wherein said means for rating the outbound call and completing the outbound call further comprises:

means for transmitting the outbound call from a cellular area wherein the station is located to said IN platform to determine how to bill and route the outbound call;

means for using the station identification number and said dialed destination number to determine if the outbound call is one of a private dialing plan call, a debit call, and a restricted call.

8. A system according to claim 7, wherein said means for rating the outbound call and completing the outbound call further comprises:

means for billing the outbound call to a private dialing plan customer in arrears if it is determined that the outbound call is a private dialing plan call.

9. A system according to claim 7, further comprising:

means for determining if the outbound call is a debit call, comprising:

means for permitting completion of the outbound call if it is determined that there are sufficient funds registered to the station to complete the outbound call for a predetermined period of time, wherein said call credits are consumed during the outbound debit call, during a subsequent outbound debit call, and during a subsequent inbound debit call.

10. A system according to claim 7, further comprising:

means for preventing completion of the outbound call if it is determined that the outbound call is a restricted call.

* * * * *